US005581482A

United States Patent [19]
Wiedenman et al.

[11] Patent Number: 5,581,482
[45] Date of Patent: Dec. 3, 1996

[54] PERFORMANCE MONITOR FOR DIGITAL COMPUTER SYSTEM

[75] Inventors: Gregory B. Wiedenman, Woodbury; Randy L. DeGarmo, Oakdale, both of Minn.

[73] Assignee: Unisys Corporation, Blue Bell, Pa.

[21] Appl. No.: 233,138

[22] Filed: Apr. 26, 1994

[51] Int. Cl.$^6$ .................................................. G01B 11/30
[52] U.S. Cl. ................ 364/551.01; 364/550; 395/184.01
[58] Field of Search ............................. 364/550, 551.01; 395/575

[56] References Cited

U.S. PATENT DOCUMENTS

| | | | |
|---|---|---|---|
| 3,818,458 | 6/1974 | Deese | 340/172.5 |
| 4,034,353 | 7/1977 | Denny et al. | 364/200 |
| 4,166,290 | 8/1979 | Furtman et al. | 364/200 |
| 4,231,106 | 10/1980 | Heap et al. | 364/900 |
| 4,367,525 | 1/1983 | Brown et al. | 364/200 |
| 4,458,309 | 7/1984 | Wilder, Jr. | 364/200 |
| 4,521,849 | 6/1985 | Wilder, Jr. | 364/200 |
| 4,590,550 | 5/1986 | Eilert et al. | 364/200 |
| 4,623,984 | 11/1986 | Yokokawa et al. | 364/900 |
| 4,654,848 | 3/1987 | Noguchi | 371/20 |
| 4,821,178 | 4/1989 | Levin et al. | 364/200 |
| 4,905,171 | 2/1990 | Kiel et al. | 364/551.01 |
| 5,051,944 | 9/1991 | Fetterolf et al. | 364/900 |
| 5,062,055 | 10/1991 | Chinnaswany et al. | 364/513 |
| 5,067,107 | 11/1991 | Wade | 395/500 |
| 5,123,017 | 6/1992 | Simpkins et al. | 371/15.1 |
| 5,193,179 | 3/1993 | Laprade et al. | 395/575 |
| 5,210,862 | 5/1993 | DeAngelis et al. | 395/575 |
| 5,245,638 | 9/1993 | Gustafson | 395/575 |
| 5,276,809 | 1/1994 | Chisvin et al. | 395/250 |

OTHER PUBLICATIONS

James W. Nilsson, Electric Circuits, Techniques of Circuit Analysis, p. 74, 1983.
Unisphere, "Getting Started in 1100/2200 Performance Monitoring", Nov. 1993, pp. 31–35, 64.
Harden et al., "A Performance Monitor for the MSPARC Multicomputer", Proc. IEEE Southeastcon '92, p. 724–729, vol. 2.
Hewlett Packard, Test & Measurement Catalog, 1992, pp. 332, 333, 338, 339.

*Primary Examiner*—Emanuel T. Voeltz
*Assistant Examiner*—Patrick J. Assouad
*Attorney, Agent, or Firm*—Nawrocki, Rooney & Sivertson, P.A.

[57] ABSTRACT

An apparatus for monitoring the performance of a computer system. A number of performance monitoring hardware elements may be placed throughout a computer system to simultaneously monitor the performance of a number of distinct components within the computer system. An advantage of the present invention over a software based approach is that the present invention allows any node within the computer system to be monitored. In addition, the present invention does not run on the systems CPU and therefore the performance monitoring function does not decrease system performance while operating. Finally, because the present invention does not run on the system's CPU, the results of the performance monitoring function may be more accurate than a software base approach.

22 Claims, 14 Drawing Sheets

PERFORMANCE MONITOR FOR DIGITAL COMPUTER SYSTEM

CROSS REFERENCE TO CO-PENDING APPLICATIONS

This invention is related to commonly assigned U.S. patent application Ser. No. 08/173,429, filed Dec. 23, 1993, entitled "Hub and Street Architecture", and to commonly assigned U.S. patent application Ser. No. 08/173,408, filed Dec. 23, 1993, entitled "Micro-Engine Dialogue Interface". Both of these related Applications are incorporated herein by reference.

BACKGROUND OF THE INVENTION

1. Field of the Invention

The present invention is generally related to general purpose, stored program, digital computers and more particularly relates to an efficient means for monitoring the performance of various portions of a computer system.

2. Description of the Prior Art

The term "performance monitoring" refers to the process of monitoring the performance of various system components within a computer system while the computer system is operating under normal operating conditions. Performance monitoring is a key factor in the operation and maintenance of many of today's complex computer systems.

In the past several decades, the demand on computer systems has steadily increased. Today's software packages require much more processing power and storage capacity than those produced just a few years ago. In addition, many more people are using computers to do tasks that were traditionally done using other means. Because computer systems remain relatively expensive to purchase and maintain, many end users are operating their computer systems at a much higher capacity than in the past. This increased demand results in a higher probability that performance problems will occur in a given system.

Many factors may reduce the optimal performance of a computer system. First, there may be a bottleneck at the input/output interface causing the CPU to idling a substantial portion of time waiting for data. Second, the users of a system may routinely execute a particular computer program. If the system is not configured properly, the system may be required to load the computer program from an external disk into internal memory each time the program is executed thereby unnecessarily slowing down system performance. In this example, system performance could be increased by recognizing that this is occurring, preferably by using performance monitoring techniques, and changing the system's configuration to keep the particular computer program in the computers internal memory during peak usage periods. Finally there may be not enough internal memory within the computer system to store all of the computer programs that are to be simultaneously executed by the users. This can result in "disk swapping". Disk swapping occurs when internal memory limitations require a computer program or the resulting data from the computer program to be loaded and unloaded from an external storage disk each time a process becomes active. Disk swapping can also occur when a single process is executing. Disk swapping can especially be a problem in multi-user systems and systems that utilize re-entrant computer programs.

The above examples are given only to illustrate the necessity for performance monitoring techniques within a computer system and are not intended as an exhaustive list. It is recognized that many other performance inhibitors exist in modern computer systems and that many of them may be detected by using performance monitoring techniques.

Another, less obvious, motivation for monitoring the performance of a computer system is to debug a particular system during system development or to debug a particular software program during software development. Often it is unknown where the bottlenecks are likely to occur within a computer system or software program that is under development. Performance monitoring techniques can be used to produce data that can be statistically analyzed to provide computer designers and software developers insight into where in the computer system future bottlenecks or problems are likely to occur.

Performance monitoring of today's computer systems is typically provided by using off the shelf software packages. Examples of such off-the-shelf performance monitoring software packages include CMF baseline, the Torch program available from Datametrics, the SIP Database written by Structural Metals Inc. and available through the USE Program Library Interchange (UPLI), the ALICE module of the SYSTAR products, and the Online Activity Monitor (OSAM) available from TeamQuest. These software packages are executed on a particular computer or computer network and generate performance data based on a number of preselected factors. One such method is discussed in "Getting Started in 1100/2200 Performance Monitoring", by George Gray, UNISPHERE Magazine, November 1993.

These off the shelf software packages may prove to be useful for some users but they are not an ideal solution for others. Problems that exist with these software packages include: (1) only the performance parameters selected by the software developer are available to the user; (2) the software packages are typically only available for standard computer systems and therefore cannot be used during the development stage of a computer system or on less known computer systems without independent development of the performance monitoring software; (3) the software packages are typically run concurrently with and on the same CPU as the user software and therefore may slow down systems performance while the performance monitoring software is executed; and (4) only hardware that is accessible by the software package, like CPU activity and I/O requests, can be monitored by these software packages.

Problems (1) and (2) listed above may be minimized by having the user write a customized performance monitoring software package for the user's system. However, this requires a significant investment in resources to develop such a program. Problems (3) and (4) listed above cannot typically be eliminated by having the user write a customized software package for several reasons. First, only the nodes within the computer system that are accessible to the performance monitoring software can monitored. This limitation is a result of having the performance monitoring strategy determined after the computer hardware is designed. Many nodes within a computer system are neither controllable nor observable via software. Second, the performance monitor software is run on the same CPU as the user programs and therefore may decrease overall system performance. Finally, since the performance monitoring software may effect the performance of the system in which the software is attempting to measure, the overall accuracy of the results obtained by the performance monitoring software packages may be limited.

SUMMARY OF THE INVENTION

The present invention overcomes the disadvantages found in the prior art by providing a hardware based approach to performance monitoring (PM). In the present invention, a number of performance monitoring hardware elements may be placed throughout a computer system to simultaneously monitor the performance of a number of distinct components.

An advantage of utilizing separate PM hardware units for performance monitoring is that the performance monitoring function does not reduce system performance. That is, unlike the software method discussed above, the present invention is not required to run on the systems microprocessor. Rather, separate and distinct hardware elements are provided to monitor the performance of various components within the system.

Another advantage of the present invention is that more accurate performance data can be obtained. Since the performance monitoring hardware may not affect the performance of the computer system itself, more accurate results may be obtained than in the software approach discussed above.

The Performance Monitoring (PM) hardware of the present invention may be designed simultaneously with the computer system to ensure that all of the appropriate nodes within the computer system can be monitored. In a preferred mode of the present invention, the performance monitoring hardware may be placed in any number of locations within the system and may be coupled to literally any node within the computer system. In systems utilizing the software based techniques described above, only nodes that are accessible to the software may be monitored. Therefore, the present invention can monitor otherwise un-observable and un-controllable nodes.

Even if the present invention is utilized in an existing computer system, and not designed into the system as described above, significant advantages can still be realized. For example, enhanced speed can be realized because the Performance Monitoring function does not execute on the system's CPU. In addition, the performance monitoring hardware of the present invention can be coupled to various nodes within the computer system that may not be accessible with the software based approach.

An exemplary embodiment of the present invention provides for monitoring either the program address of a microprocessor or microsequencer or by monitoring various other signals within the computer system. This embodiment of the present invention, the performance monitoring hardware provides statistics on how often an address or range of addresses are executed by a microprocessor. This enables the system engineer to determine how often a particular line of code or section of code is executed during a particular period of time. For example, the system engineer may monitor the number of times an I/O routine or disk swapping routine is executed during a given period of time. This provides the system engineer with essential information on the general efficiency of the computer system.

In an exemplary embodiment of the present invention, the system engineer may select any line or section of code to monitor. Therefore, any aspect of system operation may be monitored by choosing the relevant code section. This provides nearly unlimited versatility to the system engineer for monitoring the performance of the system. Along with this versatility is the advantage that the present invention does not run on the system's CPU and therefore may not slow system performance and may provide more accurate performance results.

In another embodiment of the present invention, a number of internal nodes selected by the system Engineer may be monitored. An advantage of this embodiment is that virtually any node within a computer system can be selected by the system Engineer. In a similar manner as above, the number of events occurring on the selected nodes can be counted and reported. Generally, the internal nodes that are monitored may be specified differently for each implementation of the PM hardware. Signals that may be monitored in this embodiment including, but are not limited to, an enable signal, a clock signal, an I/O signal, or any other signal that may provide information regarding the performance of a system.

A preferred embodiment of the present invention has two modes of operation for counting events within the system. The first mode of operation counts the number of events that occur on a preselected node over a predetermined period of time. The second mode of operation counts the number of events that occur on a preselected "sample pulse" node provided by the system but only when an event is present during the sample pulse period. The second mode is ideal for measuring the percentage of activity of the preselected node.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENT

Figure 1:
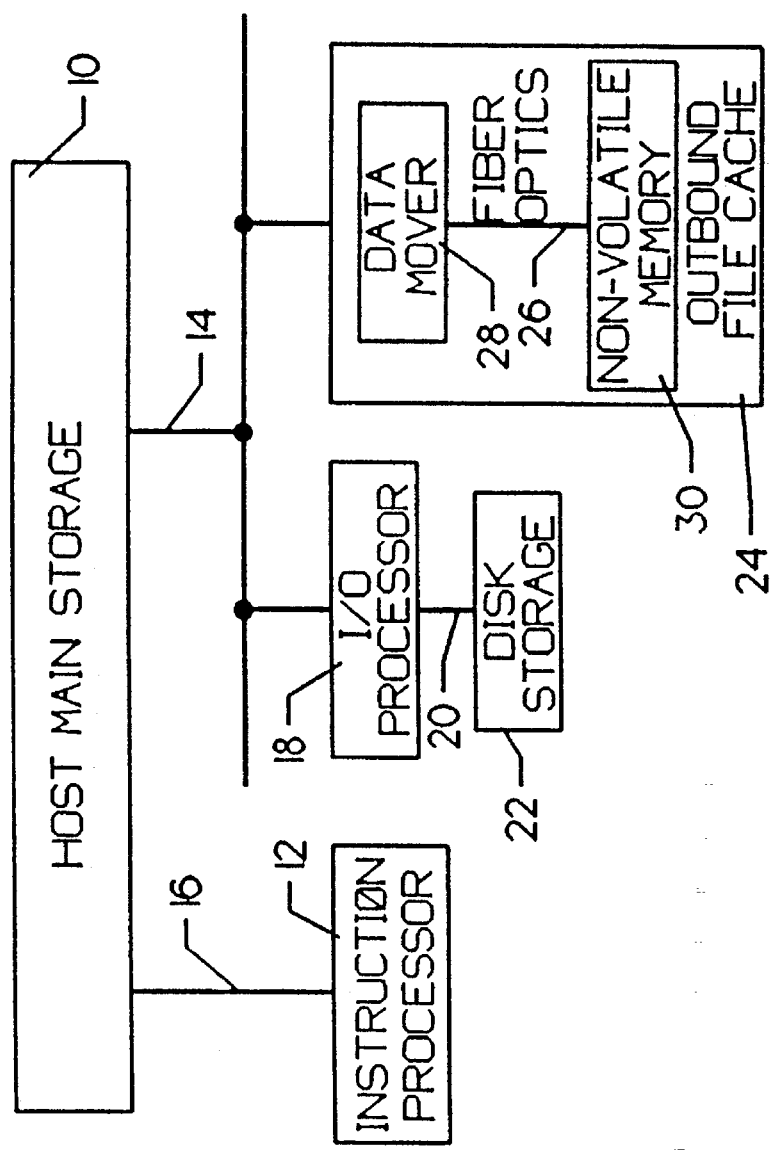
FIG. 1 is a block diagram of the Extended Processor Complex (XPC)

FIG. 1 is a block diagram of the extended processor complex (XPC) of a preferred mode of the present invention.

The XPC comprises an instruction processor 12, IO processor 18, disk storage 22, Outbound File Cache (XIOP) 24, and host main storage 10. Instruction processor 12 receives instructions from host main storage 10 via wire 16. Host main storage 10 is also coupled to MBUS 14. I/O processor 18 is coupled to MBUS 14 and is further coupled to disk storage 22 via wire 20. The Outbound File Cache block 24 is also coupled to MBUS 14. Outbound File Cache block 24 comprises a data mover 28 and nonvolatile memory 30.

Data mover 28 is coupled to nonvolatile memory 30 via fiber-optic cable 26. The data is transferred from the disk storage 22 through I/O processor 18 to the host main storage 10. But now, any updates that occur in the data are stored in the Outbound File Cache 24 nonvolatile memory 30 instead of disk storage 22, at least momentarily. All future references then access the data in the nonvolatile memory 30. Therefore the nonvolatile memory 30 acts like a cache for the disk and significantly increases data access speeds. Only after this data is no longer being used by the system is it transferred back to disk storage 22. In the Outbound File Cache, data mover 28 is connected to MBUS 14 and is used to transmit data from the host main storage 10 to the nonvolatile memory 30 and vice versa. Only one data mover 28 is illustrated in FIG. 1.

Figure 2:
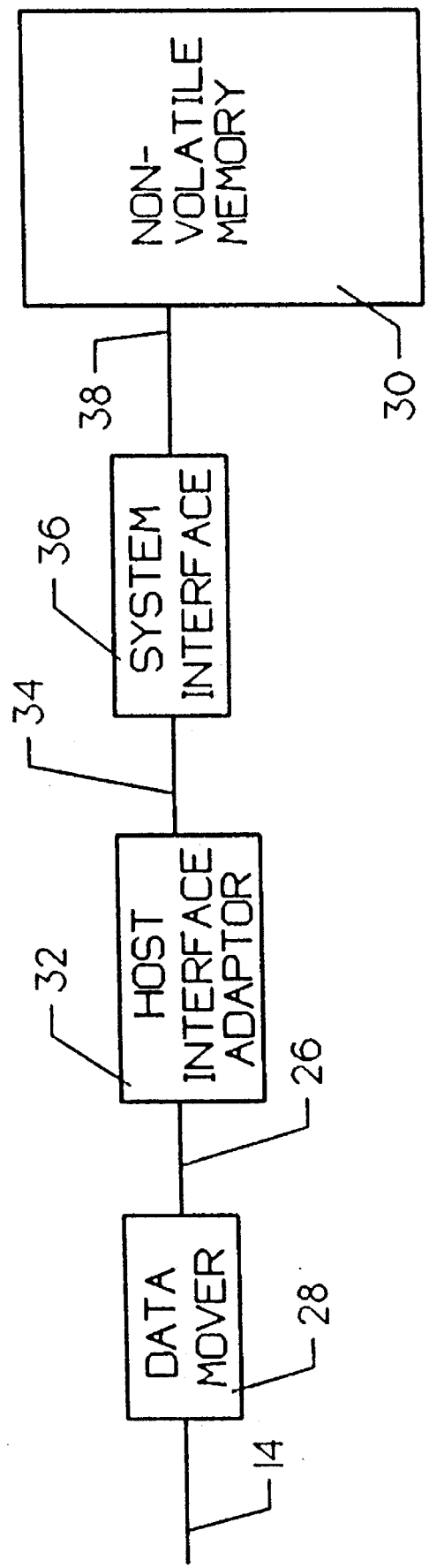
FIG. 2 is a block diagram of the Outbound File Cache Block.

FIG. 2 is a block diagram of the Outbound File Cache block 24 (see FIG. 1). Within the Outbound File Cache block 24, additional components are required to interface with the nonvolatile memory. These include host interface adaptor 32 and a system interface 36. Data mover 28 is coupled to MBUS 14 and further coupled to host interface adaptor 32 via fiber-optic interface 26. System interface 36 is coupled to host interface adaptor 32 via wire 34 and further coupled to nonvolatile memory 30 via wire 38. For every data mover 28 there is a host interface adaptor 32 and system interface 36 which is added to the system. As more and more data movers 28 are added to the system, it becomes apparent that a bottle neck could occur in requests to the nonvolatile memory 30. As a result, the size of the nonvolatile memory 30 and the necessary bandwidth which is required to access this memory becomes a major performance concern. The preferred mode of the system of alleviates this problem by allowing a plurality of nonvolatile memory elements to be connected in parallel and further allowing access to every nonvolatile memory element from every input port.

On each system interface card 36 a processor called an index transaction processor (IXP) is used to manage the caching function (just one of the IXP's functions). So the index transaction processor (see FIG. 5, IXP1 192 for an example) also has a path to nonvolatile memory 30.

Figure 3:
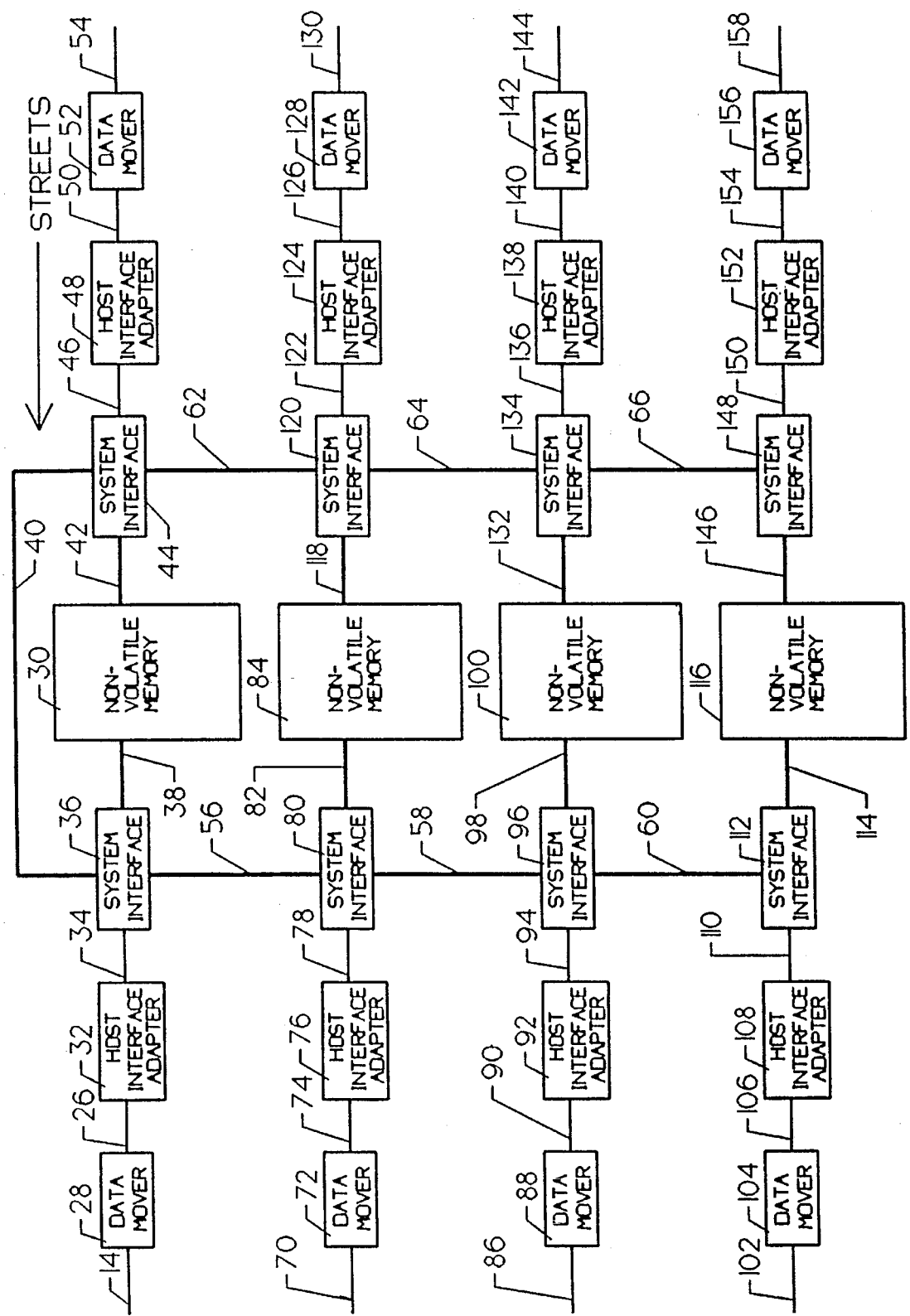
FIG. 3 is a block diagram of the interconnect of Outbound File Cache blocks.

FIG. 3 is a block diagram of the interconnect of the Outbound File Cache blocks within the system. The street architecture is a network of interconnecting system interface cards (SIF) that allow requesters on one SIF card to travel to another SIF card to access the nonvolatile memory (the System Interface Cards are indicated in FIG. 3 via reference numerals 36, 80, 96, 112, 44, 120, 134 and 148). Each nonvolatile memory 30, 84, 100 and 116 is independent from the others. However, any nonvolatile memory block can be accessed by any SIF by way of the streets.

Data movers 28, 72, 88 and 104 are coupled to input ports 14, 70, 86 and 102, respectively. Similarly data movers 52, 128, 142 and 156 are coupled to input ports 54, 130, 144 and 158, respectively. Host interface adaptor 32 is coupled to data mover 28 via fiber-optic interface 26 and further coupled to system interface 36 via wire 34. Host interface adaptor 76 is coupled to data mover 72 via fiber-optic interface 74 and further coupled to system interface 80 via wire 78. Host interface adaptor 92 is coupled to data mover 88 via fiber-optic interface 90 and further coupled to system interface 96 via wire 94. Host interface adaptor 108 is coupled to data mover 104 via fiber-optic interface 106 and further coupled to system interface 112 via wire 110. Host interface adaptor 48 is coupled to data mover 52 via fiber-optic interface 50 and further coupled to system interface 44 via wire 46. Host interface adaptor 124 is coupled to data mover 128 via fiber-optic interface 126 and further coupled to system interface 120 via wire 122. Host interface adaptor 138 is coupled to data mover 142 via fiber-optic interface 140 and further coupled to system interface 134 via wire 136. Host interface adaptor 152 is coupled to data mover 156 via fiber-optic interface 154 and further coupled to system interface 148 via wire 150.

Nonvolatile memory 30 is coupled to system interface 36 via wire 38 and further coupled to system interface 44 via wire 42. Nonvolatile memory 84 is coupled to system interface 80 via wire 82 and further coupled to system interface 120 via wire 118. Nonvolatile memory 100 is coupled to system interface 96 via wire 98 and further coupled to system interface 134 via wire 132. Nonvolatile memory 116 is coupled to system interface 112 via wire 114 and further coupled to system interface 148 via wire 146.

System interface 96 is coupled to system interface 112 via wire 60 and further coupled to system interface 80 via wire 58. System interface 36 is coupled to system interface 80 via wire 56 and further coupled to system interface 44 via wire 40. System interface 120 is coupled to system interface 44 via wire 62 and further coupled to system interface 134 via wire 64. Finally, system interface 148 is coupled to system interface 134 via wire 66.

Wires 60, 58, 56, 40, 62, 64 and 66 represent the streets within the system architecture. Note that the nonvolatile memories 30, 84, 100 and 116 are distributed among the system interface cards 36, 80, 96, 112, 44, 120, 134 and 148. Each system interface card has its own local memory but may access any of the other nonvolatile memories 30, 84, 100 and 116 by taking the appropriate street to that particular nonvolatile memory.

The structure depicted in FIG. 3 is in the "A" power domain except for the data movers 28, 72, 88, 104, 52, 128, 142 and 156. A power domain is defined as the portion of a system that is driven by a particular group of power supplies. In the preferred embodiment, each power domain has two power supplies connected to two different AC entrances. For resilient purposes, the Outboard File Cache has two power domains, namely "A" and "B".

In the preferred embodiment, there is a redundant structure, identical to that contained in FIG. 3 (but not shown in FIG. 3), that is connected to the "B" power domain. Each nonvolatile memory 30, 84, 100, 116 then has two paths from data movers 28, 72, 88, 104, 52, 128, 142 and 156 that are in the "A" power domain and two paths from data movers 28, 72, 88, 104, 52, 128, 142 and 156 that are in "B" power domain (For example NVM 30 has paths to Data Mover 28 and Data Mover 52 in the "A" power domain. NVM 30 would also have the same paths to the Data Movers in power domain "B").

Figure 4:
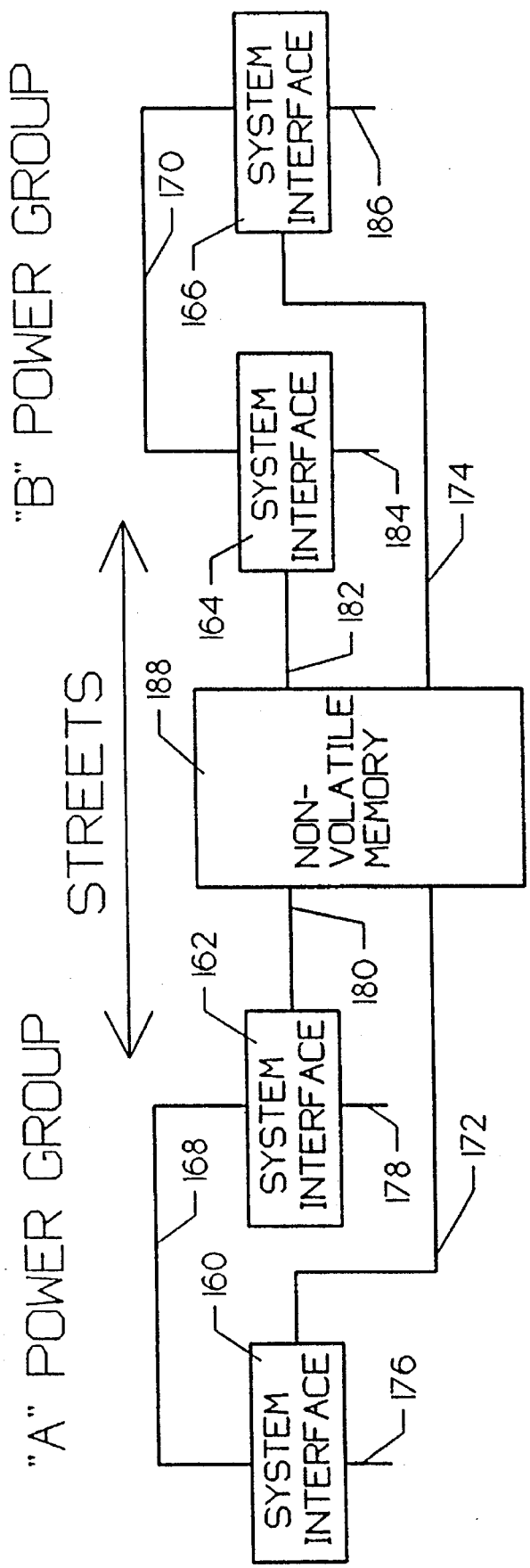
FIG. 4 is a detailed block diagram of the interconnect between the system interface cards and the non-volatile memory.

FIG. 4 is a detailed block diagram of the interconnect between system interface cards and the nonvolatile memory. FIG. 4 shows both "A" power domain system interface cards and the redundant "B" power domain system interface cards. System interface 160 is coupled to street 176 and further coupled to system interface 162 via street 168. System interface 160 is also coupled to nonvolatile memory 188 via wire 172. System interface 162 is coupled to street 178 and further coupled to nonvolatile memory 188 via wire 180. Similarly, system interface 166 is coupled to street 186 and further coupled to system interface 164 via street 170. System interface 166 is also coupled to nonvolatile memory 188 via wire 174. System interface 164 is coupled to street 184 and further coupled to nonvolatile memory 188 via wire 182. It can be seen from this diagram that both "A" power domain system cards and "B" power domain system cards access the same nonvolatile memory 188.

Figure 5:
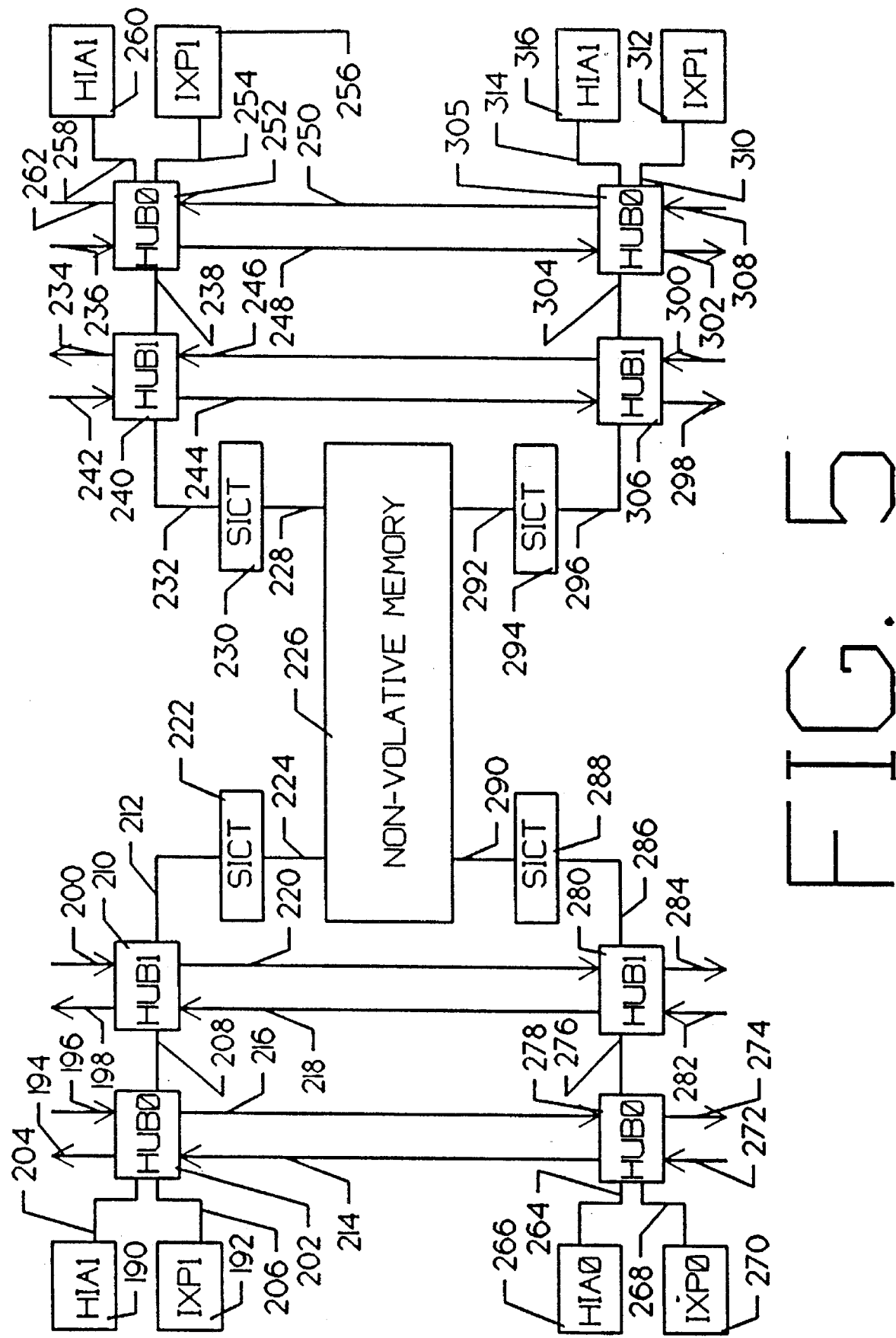
FIG. 5 is a detailed block diagram of a back panel block.

FIG. 5 is a detailed block diagram of a Backpanel block. An individual system interface (SIF) card (see FIG. 3, reference numerals 36, 80, 96, 112, 44, 120, 134 and 148) comprises one index transaction processor (IXP), two HUB's (HUB0 and HUB1) and one storage interface controller (SICT). A Backpanel has four SIF cards interconnected as shown in FIG. 5.

In FIG. 3 the streets between SIF's 36, 80, 96, 112, 44, 120, 134 and 148 were represented by single lines 60, 58, 56, 40, 62, 64 and 66. In reality, the preferred embodiment contains two pairs of streets connecting each SIF card (and consequently, two HUB's). Both HUB0 and HUB1 can communicate either up the "UP" streets or down the "DOWN" streets.

The streets on HUB0 are called requester streets (because only the IXP's and HIA's may direct requests to these streets). The streets on HUB1 are called responder streets (because only the nonvolatile memory may direct responses to these streets). Having separate streets for requests and responses improves overall performance of the street network. However, it should be noted that this description should not limit the scope of the present invention to this configuration.

The HUB0 elements 202, 278, 252 and 305 has five interfaces each: (1) HIA, (2) IXP, (3) up street (4) down street, and (5) an interface to the corresponding HUB1 element. The HUB1 elements 210, 280, 240 and 306 are the same electrical device as the HUB0 elements but the interfaces within the system are (1) SICT, (2) up street, (3) down street, (4) cross over interface to the other power domain and (5) interface to the corresponding HUB0 element.

Referring to FIG. 5, HUB0 202 is coupled to IXP1 192 via wire 206 and is further coupled to HIA1 190 via wire 204. HUB0 202 is also coupled to UP street 194 and DOWN street 196, and further coupled to HUB0 278 via UP street 214 and DOWN street 216. HUB0 278 is coupled to IXP0 270 via wire 268 and further coupled to HIA0 266 via wire 264. HUB0 278 is also coupled to UP street 272 and DOWN street 274 (same with 218, 220, 198, 200, 282, 284, 234, 242, 244, 246, 298, 300, 236, 262, 248, 250, 302 and 308 respectively). HUB1 210 is coupled to HUB0 202 via wire 208 and further coupled to SICT 222 via wire 212. HUB1 is also coupled to street 198 and 200, and further coupled to HUB1 280 via streets 218 and 220. HUB1 280 is coupled to HUB0 278 via wire 276 and further coupled to SICT 288 via wire 286. HUB1 is also coupled to street 282 and street 284. HUB0 252 is coupled to IXP1 256 via wire 254 and further coupled to HIA1 260 via wire 258. HUB0 252 is also coupled to streets 236 and 262. HUB0 305 is coupled to IXP1 312 via wire 310 and further coupled to HIA1 316 via wire 314. HUB0 305 is also coupled to HUB0 252 via streets 248 and 250. Finally, HUB0 305 is coupled to streets 302 and 308. HUB1 240 is connected to HUB0 252 via wire 238 and further coupled to SICT 230 via wire 232. HUB1 240 is also coupled to streets 242, 234, 244, and 246. HUB1 306 is coupled to HUB0 305 via wire 304 and further coupled to SICT 294 via wire 296. HUB1 306 is further coupled to HUB1 240 via streets 244 and 246. Finally, HUB1 306 is coupled to streets 298 and 300. Nonvolatile memory 226 is coupled to SICT 222 via wire 224, SICT 288 via wire 290, SICT 230 via wire 228 and SICT 294 via wire 292.

Figure 6:
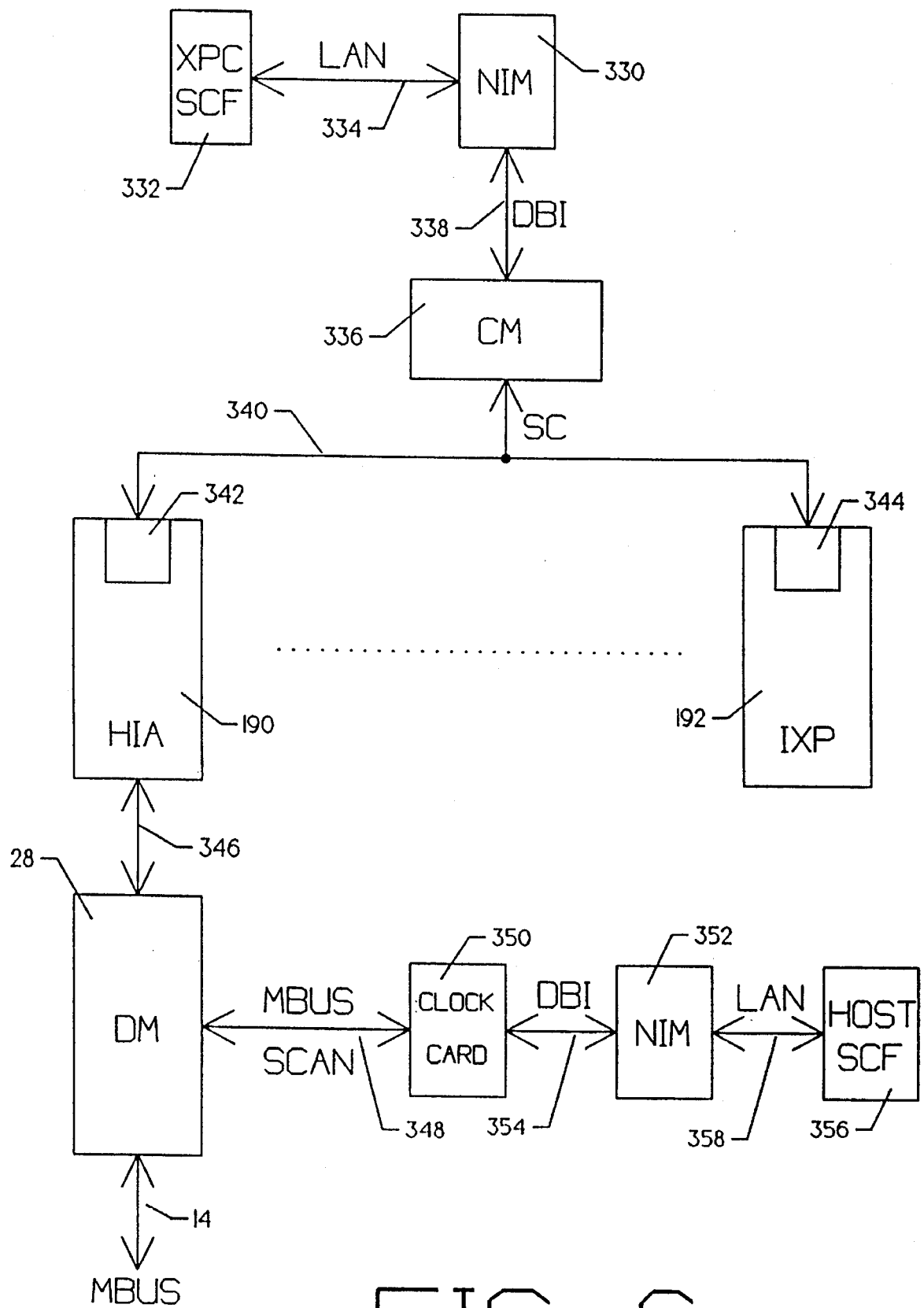
FIG. 6 is a high level block diagram of the XPC system including the network interface module (NIM)

FIG. 6 is an overall block diagram of a data processing system employed in a preferred embodiment of the present invention. A high level system control is provided by the Host System Control Facilities (SCF's) 356. Host SCF 356 provides a high level of control for the host computer complex whereas XPC SCF 332 provides a similar function for the extended processing complex (XPC). The details of the XPC complex are discusses in FIGS. 1–5. In the preferred embodiment and not to be deemed as limiting, XPC SCF 332 and Host SCF 356 are industry standard personal computers programmed to provide the desired functions.

XPC SCF 332 communicates with Network Interface Module (NIM) 330 via Local Area Network (LAN) 334. XPC SCF 332 may also control various other systems via local area network 334. Similarly, Host SCF 356 may communicate with NIM 352 via LAN 358.

NIM 330 communicates with the various system components of the XPC using the Diagnostic Bus Interface (i.e. DBI) 338. DBI 338 is a bi-directional serial data bus for the passage of the data and other needed control signals as discussed in more detail below. Clock Maintenance module (i.e. CM) 336 fans out the signals from DBI 338 to each of the system components via Scan Control 340. NIM 352 communicates with clock card 350 via DBI 354 in like fashion.

The data and control interface terminate at micro-engines 342 and 344 which provide hardware control for the Host Interface Adapter (HIA) 190 and the Index Transaction Processor (IXP) 192, respectively. The details regarding these components are more fully discussed in FIGS. 1–5. HIA 190 and IXP 192 a components of the XPC system are assumed to be representative and not limiting of the present invention. The internal operation and functions of the HIA 190 and the IXP 192 is not important for the operation of the present invention because each employs a similar microengine to which the interface is established. HIA 190 interfaces with the Data Mover (DM) module 28 via interface 346 from which data is moved to and from the memory bus via interface 14 (see FIG. 1). DM 28 is also controlled and monitored via Memory Bus (MBUS) scan interface 348.

Figure 7:
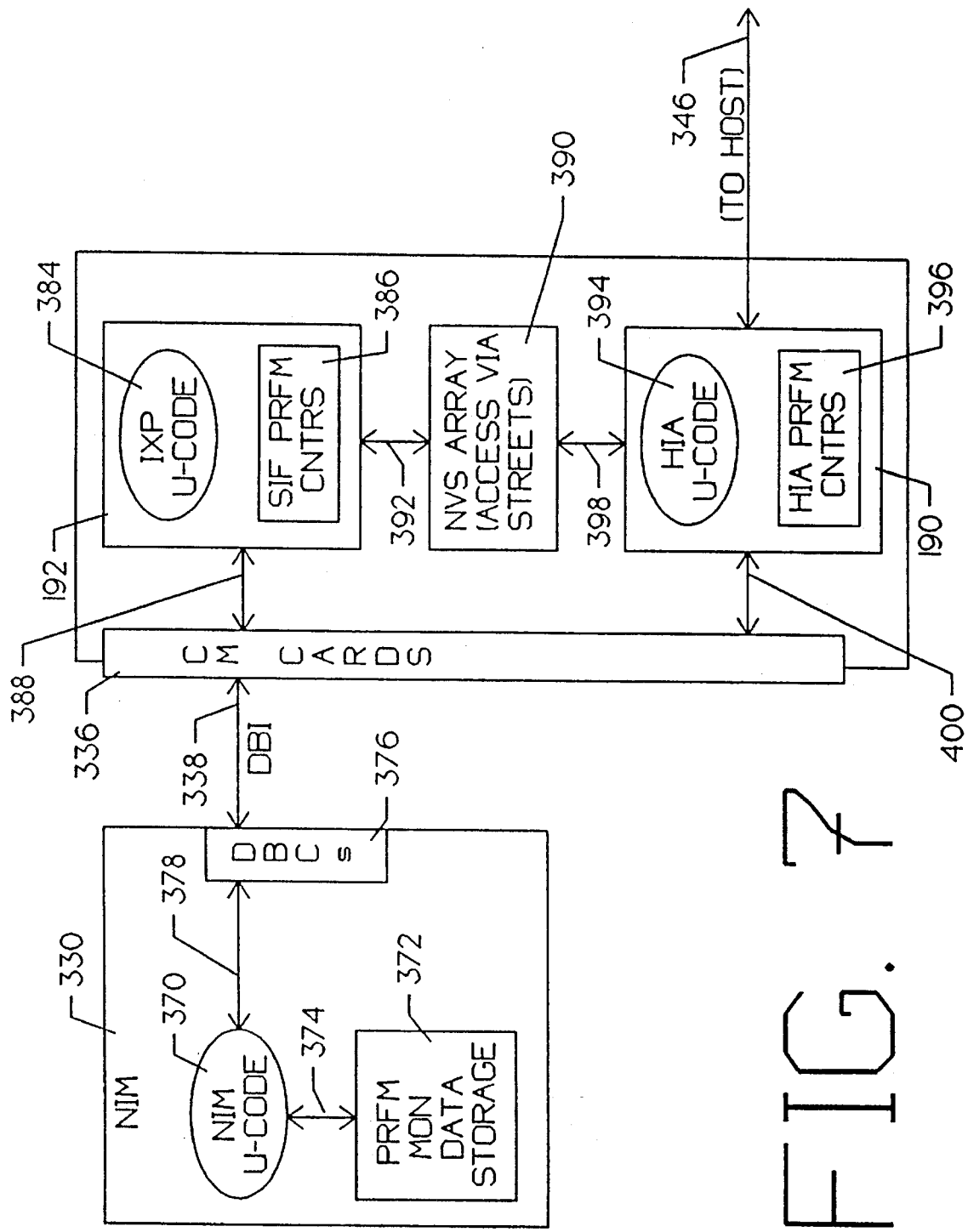
FIG. 7 is a block diagram showing the performance monitoring hardware in the XPC.

FIG. 7 is a block diagram showing the performance monitoring hardware in the XPC system. In an exemplary embodiment of the present invention, the hardware for the performance monitor function is primarily located in the Index Transition Processor (IXP) 192 and the Host Interface Adaptor (HIA) 190.

The Index Transaction Processor 192 is a micro-controlled processor that is programmed with IXP-U-CODE 384. System Interface (SIF) Performance Counters 386 are also located in IXP 192 as shown in FIG. 7. SIF Performance Counters 386 represent one instance of the Performance Monitoring hardware that is the subject of the present invention. In a preferred mode of the present invention, SIF Performance Counters 386 are implemented such that they can monitor the number of communications between IXP 192 and the streets (see FIG. 5), and between the streets and the Nonvolatile Storage 390 which may be accessed via the streets. IXP 192 is coupled to Clock Maintenance (CM) Cards 336 via interface 388. CM cards 336 are coupled to NIM 330 via Diagnostic Bus Interface 338. Periodically the performance data collected by SIF Performance Counters 386 are transferred to Performance Monitor Data Storage 372 in NIM 330 via the Diagnostic Bus Interface 338.

The Host Interface Adapter 190 is a micro-controlled processor that is programmed with HIA-U-CODE 394. HIA Performance Counters 396 are located in HIA 190 as shown in FIG. 7. HIA Performance Counters 396 represent another instance of the Performance Monitoring hardware that is the subject of the present invention. In a preferred mode of the present invention, HIA Performance Counters 396 are implemented such that they can monitor the number of communications between HIA 190 and the streets (see FIG. 5), and between the HIA and the host interface 346. HIA 190 is coupled to Clock Maintenance (CM) Cards 336 via interface 400. CM cards 336 are coupled to NIM 330 via Diagnostic Bus Interface 338. Periodically the performance data collected by the HIA Performance Counters 396 are transferred to Performance Monitor Data Storage 372 in NIM 330 via the Diagnostic Bus Interface 338.

In a preferred mode of the present invention, NIM 330 communicates with various system components of the XPC using the diagnostic bus interface (DBI) 338 (see FIG. 6). NIM 330 is a micro-controlled network interface module (NIM) programmed with NIM-U-CODE 370. As previously stated, NIM 330 also has PRFM Monitor Data Storage 372 which is coupled to NIM-U-CODE 370 via interface 374. Performance Monitor Data Storage 372 stores the performance monitor data periodically collected from IXP 192 and HIA 190. Performance Monitor Data Storage 372 stores the performance monitoring data until a host computer requests the transmission of the data for processing.

Diagnostic Bus Interface Cards 376 are coupled to NIM-U-CODE 370 via interface 378. Diagnostic Bus Interface Cards provide the required interface between NIM-U-CODE 370 and the diagnostic bus interface 338. Upon a request from the host computer via interface 346, NIM-U-CODE 370 passes the hardware Performance Monitoring data contained in Performance Monitor Data Storage 372 to a Diagnostic Bus Interface Card 376 via interface 378, across the Diagnostic Bus Interface 338 to the Clock Maintenance Cards 336, through HIA 190, and finally to the host via interface 346. The host then processes the data and may generate performance statistics.

Figure 8A:
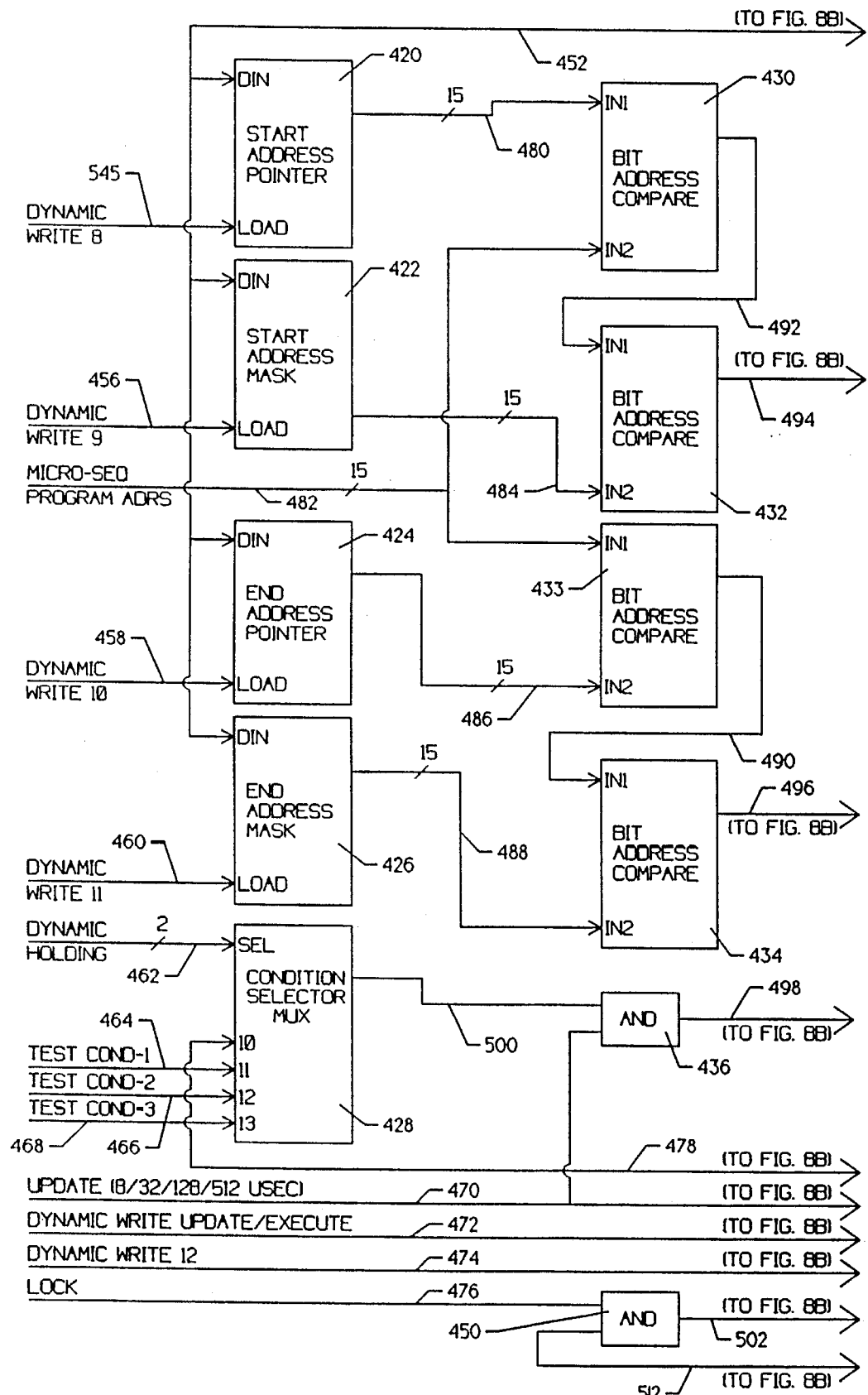
FIG. 8A is the first part of a detailed block diagram of a preferred embodiment of the performance monitoring hardware.
Figure 8B:
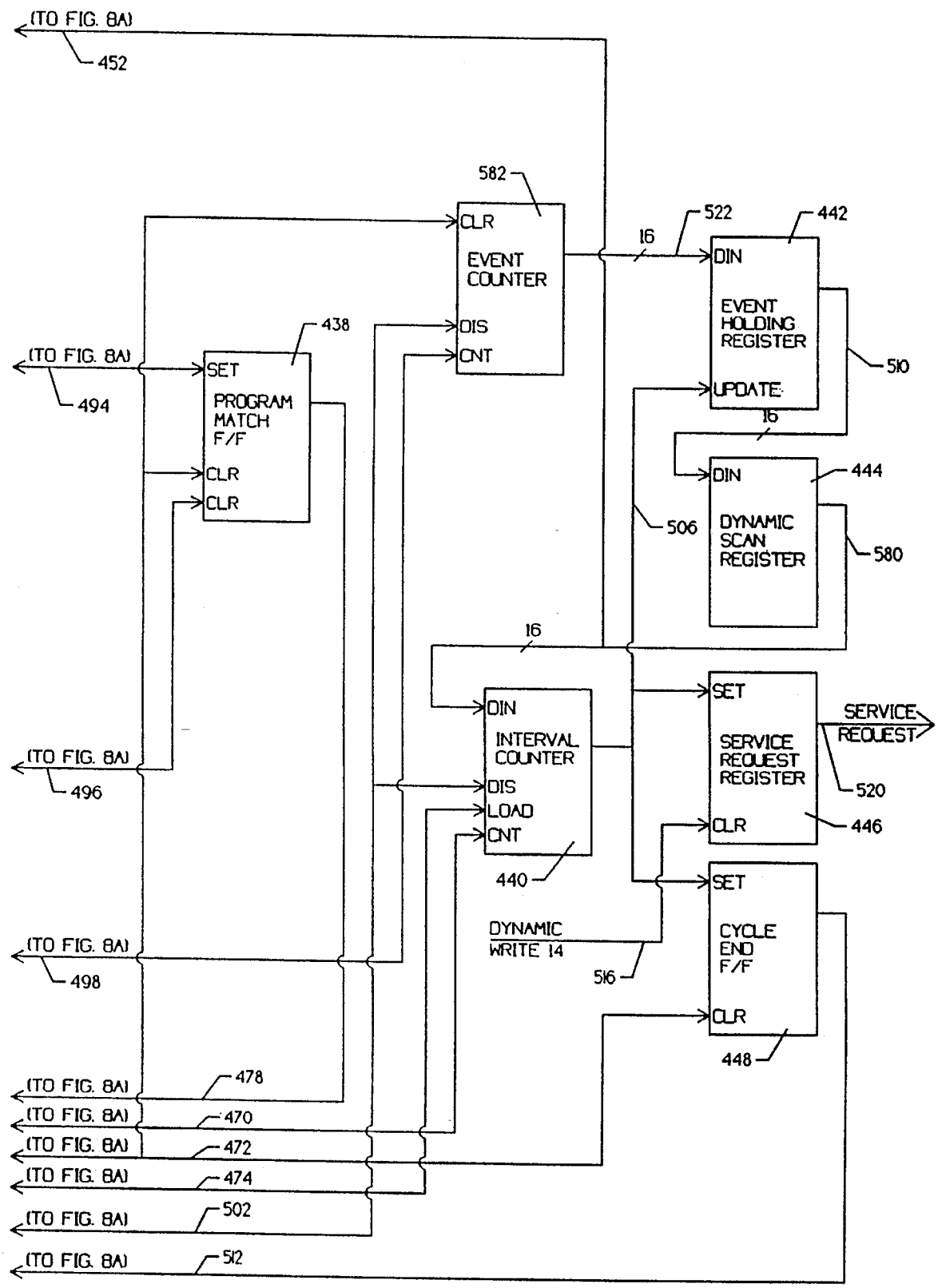
FIG. 8B is the second part of the detailed block diagram shown in FIG. 8A.

FIG. 8A is the first part of a detailed block diagram of a preferred embodiment of the performance monitoring hardware. FIG. 8B is the second part of the detailed block diagram shown in FIG. 8A. The basic operation of the performance monitoring hardware is set to count the number of times an event occurs within a fixed period of time. A preferred embodiment of the present invention provides for counting the number of events on one of a predetermined number of test condition input signals. The test condition input signals may be coupled to any node within a computer system.

Another embodiment of the present invention provides for counting the number of times an address or group of addresses are executed by a microprocessor or microsequencer in a predefined period of time. In a preferred embodiment of the present invention, this may be accomplished by comparing a microprocessor's program address with a starting address, whereby the starting address is the first sequential address of a group of addresses that are to be monitored by the present invention. A masking feature may also be provided such that only certain bits of the microprocessor's address are compared to the starting address. When the microprocessor's address and the starting address match, an event counter is incremented. The preferred embodiment then compares the microprocessor's program address with an ending address whereby the ending address is the last sequential address of the group of addresses that are to be monitored by the present invention. A masking feature may also be provided such that only certain bits of the microprocessor's address are compared to the ending address. All of this may be performed in parallel with an interval timer. The interval timer interrupts the performance monitoring hardware after a predetermined time period. The number of events that are counted during the predetermine time period may be processed by a host computer.

A preferred mode of the present invention has two separate modes of operation with respect to the interval counter. A first mode is a single sample mode which interrupts the performance monitoring hardware after the interval timer expires. A second mode is a continuous sample mode which samples continuously while resetting the interval counter between each sample.

In a preferred embodiment of the present invention, a maintenance controller may be used to control the performance monitoring hardware. The maintenance controller may provide control signals and initialization data to the PM hardware to ensure proper operation. The maintenance controller may control a number of performance monitoring hardware elements simultaneously.

Referring to FIG. 8A and FIG. 8B, a start address pointer 420 is coupled to a dynamic scan register 444 via interface 452. Start address pointer 420 may load data contained in bits 4–18 of dynamic scan register 444 when the control bit dynamic-Write-8 545 is set by maintenance. Start address pointer 420 may store the first address of a plurality of addresses which the performance monitoring hardware is to monitor.

Start address mask 422 is coupled to dynamic scan register 444 via interface 452. Start address mask 422 may load the data contained in bits 4–18 of dynamic scan register 444 when the control bit dynamic-Write-9 456 is set by maintenance. Start address mask 422 may store a number of masking bits which may be used in conjunction with start address pointer 420 as described below.

End address pointer 424 is coupled to a dynamic scan register 444 via interface 452. End address pointer 424 may load data contained in bits 4–18 of dynamic scan register 444 when the control bit dynamic-Write-10 458 is set by maintenance. End address pointer 424 may store the last address of a plurality of addresses which the performance monitoring hardware is to monitor.

End address mask 426 is coupled to dynamic scan register 444 via interface 452. End address mask 426 may load the data contained in bits 4–18 of dynamic scan register 444 when the control bit dynamic-Write-11 460 is set by maintenance. End address mask 426 may store a number of masking bits which may be used in conjunction with the end address pointer 424 as described below.

Bit address compare 430 is coupled to start address pointer 420 via interface 480. Also coupled to bit address compare 430 is the current micro sequencer program address via interface 482. Bit address compare 430 compares the value stored in start address pointer 420 with the current micro sequencer program address. The result is transferred to bit address compare 432 via interface 492. Bit address compare 432 is also coupled to start address mask 422 via interface 484. Bit address compare 432 compares the results of bit address compare 430 with the value stored in start address mask 422. Bit address compare 432 masks out the bits indicated by the value of the bits stored in start address mask 422 and will not require a match therebetween. Therefore, if the micro sequencer program address 482 compares in a bit-to-bit fashion with the value stored in start address pointer 420, with the exception of the bits indicated by the value contained in start address mask 422, a match is indicated by activating interface 494.

Program match F/F 438 has a set input coupled to bit address compare 432 via interface 494. When a program match is indicated by bit address compare 432, the program match F/F 438 is also set.

Bit address compare 433 is coupled to end address pointer 424 via interface 486. Also coupled to bit address compare 433 is the current microprocessor program address via interface 482. Bit address compare 433 compares the value stored in end address pointer 424 with the current micro sequencer program address. The result is transferred to bit address compare 434 via interface 490.

Bit address compare 434 is also coupled to end address mask 426 via interface 488. Bit address compare 434 compares the results of bit address compare 433 with the value stored in end address mask 426. Bit address compare 434 masks out the bits indicated by the value of the bits stored in end address mask 426 and will not require a match therebetween. Therefore, if the micro sequencer program address 482 compares in a bit-to-bit fashion with the value stored in end address pointer 424, with the exception of the bits indicated by the value contained in end address mask 426, a match is indicated by activating interface 496.

Program match F/F 438 has a clear input coupled to bit address compare 434 via interface 496. When a program match is indicated by bit address compare 434, the program match F/F 438 is cleared.

Condition selector MUX 428 is a 4-1 MUX controlled by two dynamic holding bits via interface 462. A first selectable input is coupled to the output of program match F/F 438. A second, third, and fourth selectable input of condition selector MUX 428 are reserved for site specific hardware events and therefore may be specified differently for each implementation of the performance monitoring hardware. The dynamic holding bits on interface 462 are set up by maintenance to select one of the four possible conditions to be monitored.

A first input of ANDGATE 436 is coupled to the output of condition selector MUX 428 via interface 500. A second input of ANDGATE 436 is coupled to UPDATE(8/32/128/512 USEC) 470. UPDATE(8/32/128/512 USEC) 470 comprises a signal having a period of either 8, 32, 128 or 512 microseconds. The period of this signal may be selectable by the maintenance controller. The output of ANDGATE 436 is coupled to the count input of event counter 582. Event counter 582 counts the number of events detected on the input selected by condition selector MUX 428, but only while UPDATE(8/32/128/512 USEC) 470 is active.

A preferred embodiment of the present invention has two modes of operation for counting events within the system. The first mode of operation counts the number of events that occur on the node selected by CONDITION-SELECTOR-MUX 428 over a predetermined time period. The second mode of operation counts the number of events that occur on UPDATE(8/32/128/512 USEC), but only when an event is present on the node selected by CONDITION-SELECTOR-MUX 428. The second mode of operation is ideal for measuring the percentage of activity of the preselected node. That is, the system may divide the total number of pulses imposed on UPDATE(8/32/128/512 USEC) by the number of events that are counted while in the second mode of operation. The result is the percentage of activity for the preselected node. If the CONDITION-SELECTOR MUX 428 is set to select the output of the PROGRAM-MATCH F/F 438, the preferred mode of the present invention uses the second mode of operation to calculate the percentage of activity.

The clear input of Event counter 582 is coupled to the clear input of program match F/F 438 and is further coupled to dynamic-write-update/execute 472. The maintenance controller can clear Program Match F/F 438 and event counter 582 by asserting dynamic-write-update/execute 472.

The time interval of the sample is controlled by an interval counter 440 which may be loaded with a starting value from dynamic scan register 444. The interval counter 440 counts once for each sample clock until the interval counter 440 overflows. The overflow condition is imposed by interval counter 440 on interface 506. Interface 506 is coupled to event holding register 442, service request register 446, and cycle-end-F/F 448. Event holding register 442 is coupled to event counter 582 via interface 522. When the overflow condition is set by the interval counter 440 on interface 508, event holding register 442 may load in the data contained in event counter 582. The resulting contents of event holding register 442 can then be transferred to dynamic scan register 444 via interface 510. Maintenance may then dynamically scan the contents of dynamic scan register 444 and use the resulting data in a performance analysis.

Service request register 446 is set when an overflow condition is imposed on interface 506 by interval counter 440. When request service register 446 is set, maintenance is notified that the sample period has been satisfied. Finally, cycle-end-F/F 448 is set when the overflow condition is imposed on interface 506 by interval counter 440. Cycle-end-F/F 448 is cleared by the same method and at the same time that program match flip flop 438 and event counter 582 are cleared.

The output of cycle-end-F/F 448 is coupled to a first input of ANDGATE 450 via interface 512. The second input of ANDGATE 450 is coupled to a lock bit via interface 476. The output of ANDGATE 450 is coupled to the disable input of interval counter 440 and the disable input of event counter 582. This configuration allows for two modes of operation, namely, the single sample and the continuous sample. The sample mode is selected by maintenance by asserting the lock bit on interface 476. The single sample mode disables the counters when an overflow condition on the interval counter is detected. The continuous sample mode allows the counters to count freely despite having an overflow condition. When an overflow condition is detected in the continuous sample mode, the interval counter is reset to an initial value and a new sample period is started. When using the continuous sample mode, maintenance must insure that it is able to retrieve the event information from the event holding register 442 before another time sample period expires.

It is recognized that this is an exemplary embodiment of the present invention and is not deemed to limit the scope of the present invention. One skilled in the art would recognize other advantages, implementations and functions of the present invention.

Figure 9:
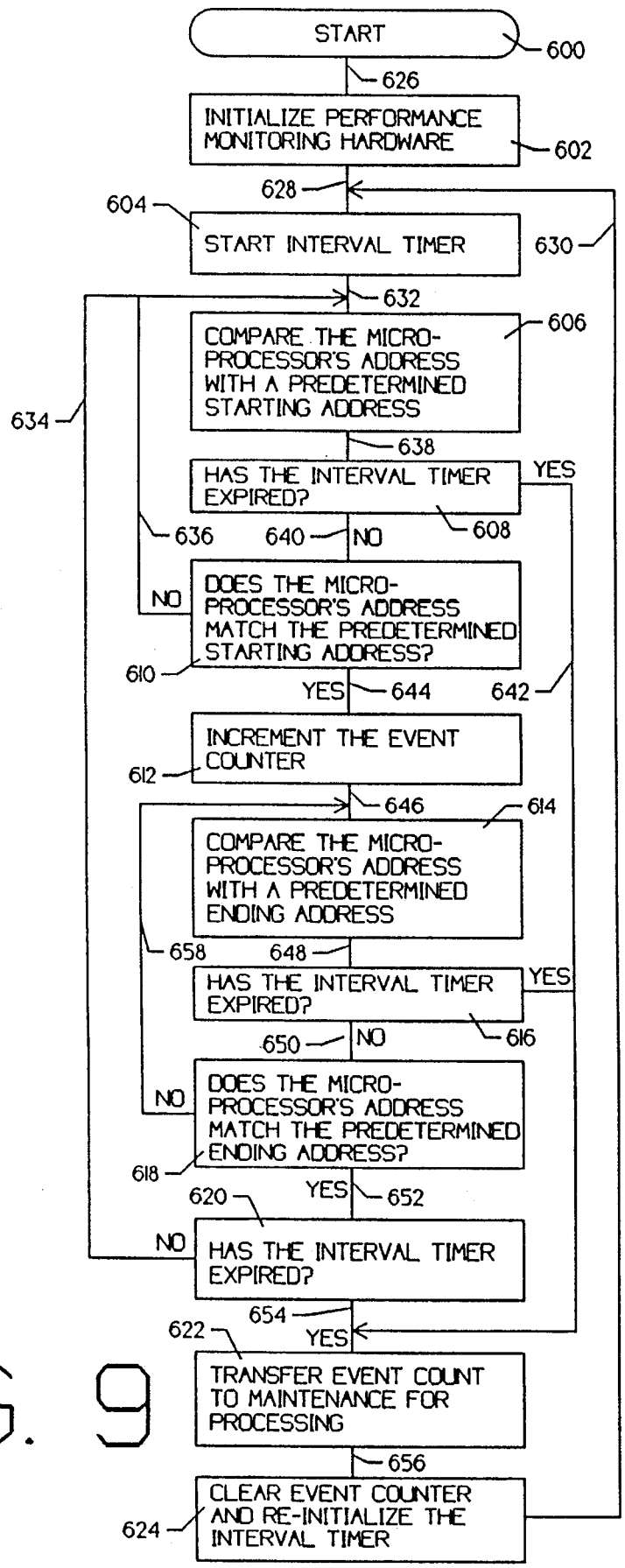
FIG. 9 is a flow diagram showing the basic operation of the continuous sample mode of a preferred embodiment of the performance monitoring hardware.

FIG. 9 is a flow diagram showing the basic operation of the continuous sample mode of a preferred embodiment of the performance monitoring hardware. As previously discussed, a preferred embodiment of the performance monitoring hardware allows for two modes of operation, the single sample mode and the continuous sample mode. The sample mode may be selected by the maintenance controller of the computer system. The single sample mode (embodiment FIG. 10) disables the counters when the interval counter 440 overflows and does not change states until serviced by maintenance. The continuous sample mode, on the other hand, allows the counters to count freely, while continuously monitoring the system for a selected event. When the interval counter 440 overflows in the continuous sample mode, the interval counter 440 is reset to an initial value and a new sample period is started. When using the continuous sample mode, the maintenance controller must insure that it is able to retrieve the event information from the event holding register 442 before another time period expires.

Referring to FIG. 9, the algorithm is entered at start block 600. Start block 600 is coupled to block 602 via interface 626. Block 602 initializes the performance monitoring hardware by initializing the various signals and registers within the performance monitoring hardware with predetermined values. Block 602 is coupled to block 604 via interface 628. Block 604 enables the interval timer 440 to begin timing a predetermined interval. The interval period may be set by Initialization block 602. Block 604 is coupled to block 606 via interface 632. Block 606 compares the microprocessor's program address with a predetermined starting address.

As previously stated, the performance monitoring hardware may be placed in a number of predetermined locations throughout the computer system. In a preferred embodiment, the performance monitoring hardware may monitor a microprocessor's program address to determine the number of times an address or group of addresses are executed during a predetermined time period. The desired address or group of addresses may be defined by a starting address and an ending address. If only one address location is to be monitored, the starting address will be equal to the ending address.

Block 606 compares the microprocessor's program address with a predetermined starting address. Block 606 is coupled to block 608 via interface 638. Block 606 determines whether the interval timer has expired. If the interval timer has not expired, control is passed to block 610 via interface 640. If the interval timer has expired, control is passed to block 622 via interface 642. Block 610 determines whether the microprocessor's program address matches the predetermined starting address when compared in block 606. If a match is not found, controls pass to block 606 via interface 636. This loop is continued until either the interval timer expires, or the microprocessor's program address matches the predetermined starting address.

A preferred embodiment of the present invention allows for certain bits to be masked from the comparison between the microprocessor's program address and the predetermined starting address. Other techniques for providing a match between the microprocessor's program address and the predetermined starting address are contemplated in the present invention.

Assuming the micro processor executes an address which will be considered a match with the predetermined starting address, control passes to block 612 via interface 644. Block 612 increments the event counter indicating that an event was detected. In the embodiment illustrated by FIG. 9, an event is defined as having the microprocessor's program address match a predetermined starting address. In other embodiments of the present invention, other types of events may be selected and monitored.

After the event counter has been incremented, control is passed to block 614 via interface 646. Block 614 compares the microprocessor's program address with a predetermined ending address. If the performance monitoring hardware is set to detect when a single address location is executed by the microprocessor, the predetermine ending address will be the same as the predetermine starting address. However, if the performance monitoring hardware is set to monitor how often a group of address are executed by the microprocessor, the predetermined ending address will be different than, and generally subsequent to, the predetermined starting address. In any event, control is passed to block 616 via interface 648. Block 616 determine if the interval timer has expired. If the interval timer has expired, control is passed to block 622 via interface 642. However if the interval timer has not expired, control is passed to block 618 via interface 650. Block 618 determines whether the microprocessor's program address matches the predetermined ending address. This comparison is done in a similar manner as in block 610. If the microprocessor's program address does not match the predetermined ending address, control is passed to block 614 via interface 658. This loop is continued until either the interval timer expires in block 616 or the microprocessor's program address matches the predetermined ending address in block 618.

If the microprocessor's program address matches the predetermined ending address, control is passed to 620 via interface 652. Block 620 determines if the interval timer has expired. If it has not expired, control is passed to block 606 via interface 634. The loop from block 606 through 618 is continued until the interval timer expires.

Once the interval timer expires, control is passed to block 622 wherein the total number of events counted during the interval are passed to a maintenance controller for processing. During this transfer, control may be passed to block 624 via interface 656. Block 624 clears the event counter and reinitializes the interval timer as well as various other elements within the performance monitor hardware. Control is then passed to block 604 and the interval timer is again started. This loop is continued until the maintenance controller interrupts the performance monitor hardware. Upon an interruption by the maintenance controller, the performance monitoring hardware may be placed in the single sample mode (embodiment FIG. 10).

In the embodiment shown in FIG. 9, the order of the steps indicated are not necessarily required for proper operation of the performance monitoring function. In addition, various blocks, such as block 608, 616, and 620 may be performed in parallel with the other blocks. For example, block 608 determines whether the interval timer has expired. This can be accomplished in parallel with the remaining blocks while still maintaining the overall functionality of the circuit.

Figure 10:
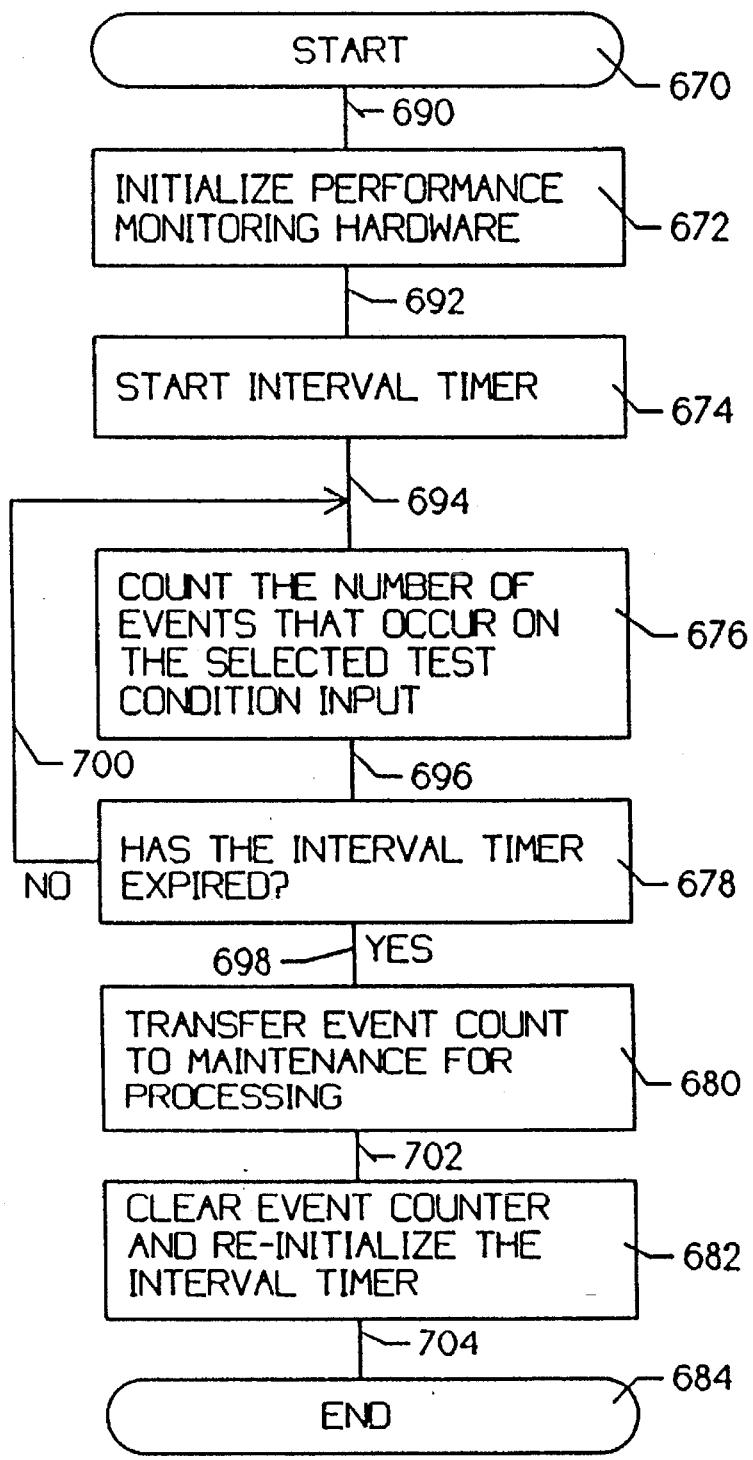
FIG. 10 is a flow diagram showing the basic operation of the single sample mode of a preferred embodiment of the performance monitoring hardware.

FIG. 10 is a flow diagram showing the basic operation of the single sample mode of a preferred embodiment of the performance monitoring hardware. The single sample mode of the present invention disables the interval counter 440 and the event counter 582 when the interval counter 440 overflows. This enables the performance monitoring hardware to determine the number of events that occur within a given period of time.

The algorithm is entered at start block 670. Block 670 is coupled to block 672 via interface 690. Block 672 initializes the performance monitoring hardware in a similar manner as described in the description to FIG. 9. Upon initialization, control is passed to block 674 via interface 692. Block 674 starts an interval timer. After the interval timer is started, control is passed to 676 via interface 694. Block 676 counts the number of events that occur on a selected test condition input.

In a preferred embodiment of the present invention, a number of different test condition inputs are reserved for user defined hardware events and may be specified differently for each implementation of the performance monitor hardware. A separate test condition input is reserved for monitoring the program address of a microprocessor thereby determining the time spent in a microprogram sequence such as an idle loop. This separate test condition input is discussed further in FIG. 9.

Block 676 is stated generally to encompass any of the selected test condition inputs. Block 676 counts the number of events that occur on the selected test condition input over a predetermined period of time. Meanwhile, control is passed to block 678 via interface 696. Block 678 determines whether the interval timer has expired. If the interval timer has not expired, control is passed to block 676 via interface 700. The performance monitoring hardware continues in this loop, counting the number of events that occur on the selected test condition input, until the interval timer expires. Once the interval timer expires, control is passed to block 680 via interface 698. Block 680 transfers the accumulated number of events that were counted by block 676 to a maintenance controller for processing. Either after or during the transfer of the number of events to a maintenance controller, control is passed to block 682 via interface 702. Block 682 clears the event counter and reinitializes the interval timer. The algorithm is exited at end block 684.

Figure 11A:
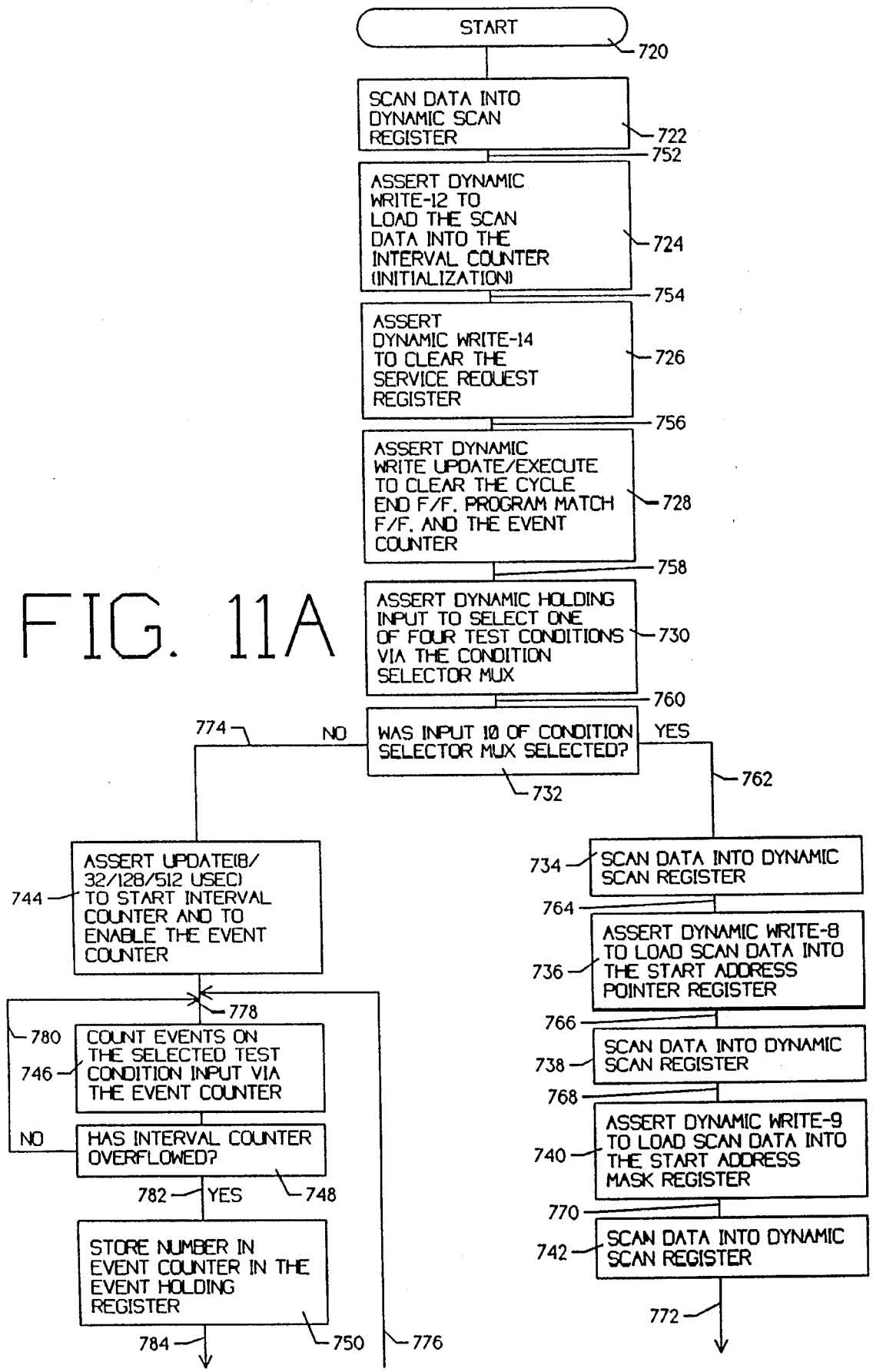
FIG. 11A is the first part of a detailed flow diagram showing the operation of a preferred embodiment of the performance monitoring hardware.

FIG. 11A is the first part of a detailed flow diagram showing the operation of a preferred embodiment of the performance monitor hardware. The algorithm is entered at start block 720 and control is given to block 722. Block 722 scans data into dynamic scan register 444. Control is then passed to block 724 via interface 752. Block 724 asserts dynamic-write-12 474 to load the data that was scanned into dynamic scan register 444 into the interval counter 440 thus initializing the interval counter 440. Control is then passed to block 726 via interface 754. Block 726 asserts dynamic-write-14 516 to clear the service request register 446. Control is then passed to block 728 via interface 756. Block 728 asserts dynamic-write-update/execute 472 to clear the cycle-end-F/F 448, the program match F/F 438 and the event counter 582. Control is then passed to block 730 via interface 738.

Block 730 asserts dynamic holding 462 in order to select one of the four test conditions via the condition selector MUX 428. In a preferred embodiment, dynamic holding 462 is a two-bit bus such that it can decode and select between interface 478, 464, 466, and 468. It is recognized that other selection means may be employed and that various numbers of test condition inputs can be used. Control is then passed to block 732 via interface 760. Block 732 determines whether input 10 (or interface 478) of condition selector MUX 428 is selected by dynamic holding 462. If it is not, control is passed to block 744 via interface 774. Block 744 asserts UPDATE(8/32/128/512 USEC) 470 to start the interval counter 440 and to enable event counter 582. Control is then passed to block 746 via interface 778.

Block 746 uses the event counter 582 to count the number of events on the selected test condition input of condition selector MUX 428. While the event counter 582 is counting the number of events on the selected test condition input, the performance monitoring hardware is continuously monitoring whether the interval counter 440 has overflowed. If the interval counter has not overflowed, control is passed back to block 746. Thus the number of events are continuously monitored and counted until the interval counter 440 overflows.

Once the interval counter 440 overflows, control is passed to block 750 via interface 782. Block 750 transfers the total number of accumulated events that have occurred from event counter 582 to event holding register 442 via interface 522. While this is occurring, control is passed to block 790 via interface 784.

Figure 11B:
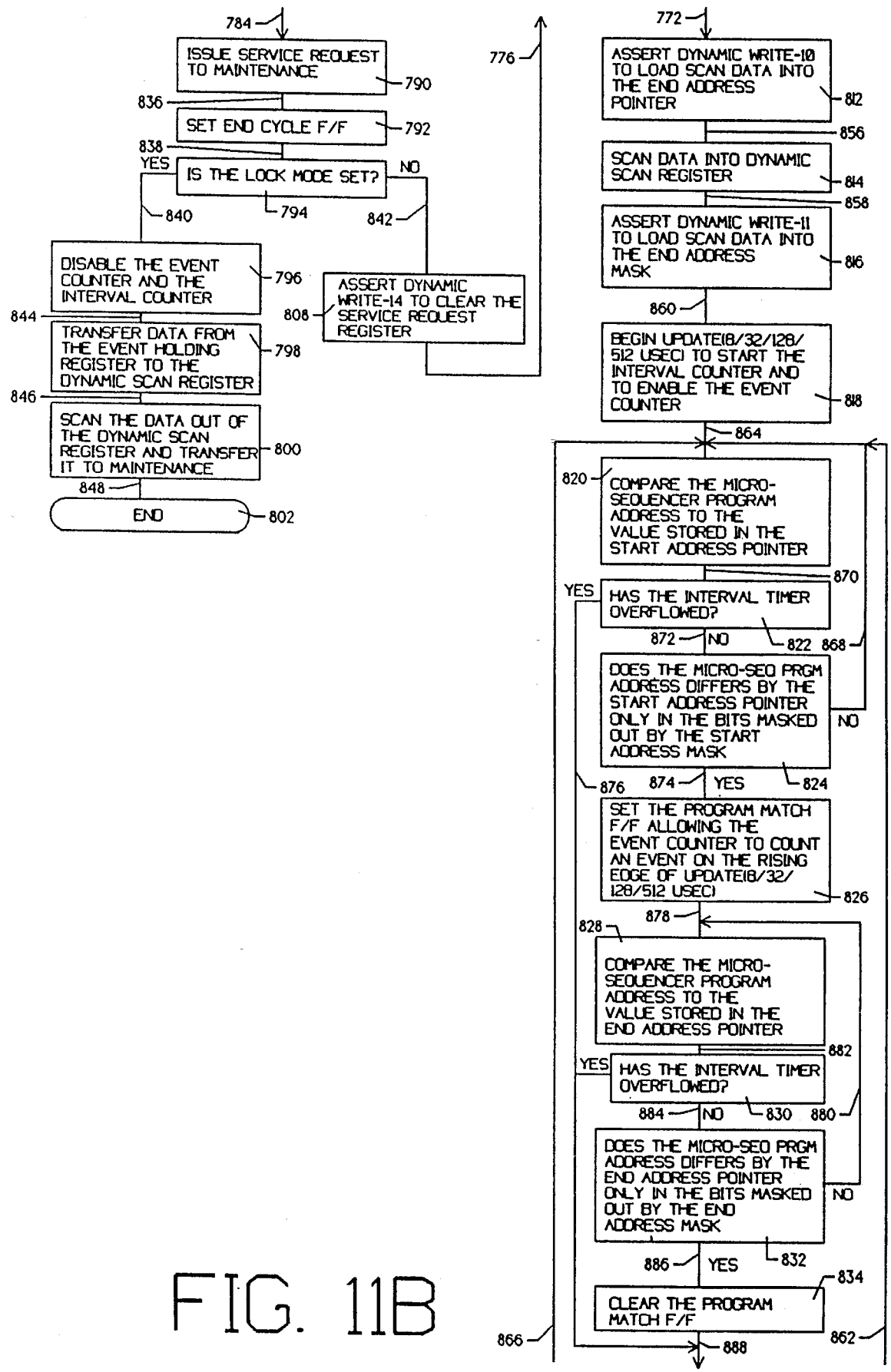
FIG. 11B is the second part of the detailed flow diagram shown in FIG. 11A.

Referring to FIG. 11B, block 790 sets the service request register 446 thus issuing a service request to the maintenance control via interface 520. In parallel with block 750 and block 790, control is also passed to block 792. Block 792 sets the cycle-end-F/F 448 indicating that the interval counter 440 has overflowed. Control is then passed to block 794 via interface 838. Block 794 determines whether the performance monitoring hardware is in the single sample mode. In a preferred embodiment of the present invention, this is accomplished by monitoring the lock input 476. If lock 476 is asserted, the performance monitoring hardware is in the single sample mode.

If the performance monitoring hardware is in single sample mode, control is passed to block 796 via interface 840. Block 796 disables the event counter 582 and the interval counter 440. In a preferred embodiment of the present invention this is accomplished with ANDGATE 450. Cycle-end-F/F 448 is set when interval counter 440 overflows thus asserting interface 512. Since the performance monitoring hardware is in the single sample mode, lock 476 is also asserted. As a result, ANDGATE 450 asserts a disable signal onto interface 502. The disable inputs of event counter 582 and interval counter 440 are coupled to interface 502 and therefore are disabled thereby. Control is then passed to block 798 via interface 844. Block 798 transfers data from the event holding register 442 to the dynamic scan register 444. Control is then passed to block 800 via interface 846. Block 800 scans the data out of dynamic scan register 444 and transfers the data to a maintenance controller. The algorithm is exited at End block 802.

Referring back to block 794, if the performance monitoring hardware is in the continuous sample mode, control is passed to block 808 via interface 842. Block 808 asserts dynamic-write-14 516 to clear the service request register 446. Control is then passed back up to block 746 via interface 776. This loop is continued until the maintenance controller interrupts the performance monitor hardware.

Referring back to block 732 in FIG. 11A, if the "10" input of condition selector MUX 428 was selected, control is given to block 734 via interface 762. Block 734 scans data into the dynamic scan register 444. This may be accomplished by traditional serial scan techniques controlled by a maintenance controller. It is recognized that other methods may be used to load the dynamic scan register. Control is given to block 736 via interface 764. Block 736 asserts dynamic-write-8 545 to load the data contained in dynamic scan register 444 into the start address pointer register 420. Control is then passed to block 738 via interface 736. Block 738 scans data in to dynamic register 444. Control is then passed to block 740 via interface 768.

Block 740 asserts dynamic-write-9 456 to load the data from dynamic scan register 444 into the start address mask register 422. Blocks 734, 736, 738, and 740 are used to load the start address pointer register 420 and the start address mask register 422 with initial values. It is recognized that other methods may be employed to load registers 420 and 422 with initial values.

Control is passed to block 742 via interface 770. Block 742 scans data into dynamic scan register 444. Control is then passed to block 812 via interface 772. Block 812 asserts dynamic-write-10 458 to load the data contained in dynamic scan register 444 into the end address pointer register 424. Control is then passed to block 814 via interface 856. Block 814 scans data into dynamic scan register 444. Control is then passed to block 816 via interface 858. Block 816 asserts dynamic-write-11 460 to load the data contained in dynamic scan register 444 into the end address mask register 426.

Blocks 742, 812, 814, and 816 load the end address pointer register 424 and end address mask register 426 with initial values. As indicated above, it is contemplated that other means may be used for loading registers 424 and 426 with initial values.

Control is passed to block 818 via interface 860. Block 818 begins clocking UPDATE(8/32/128/512 USEC) 470 to begin the interval counter 440 and to enable the event counter 582. UPDATE(8/32/128/512 USEC) 470 is clocked with a predefined clock period. In the preferred mode of the present invention, the predefined clock period that UPDATE(8/32/128/512 USEC) 470 is asserted can either be 8, 32, 128, or 512 microseconds. The specific clock period may be selected and controlled by a maintenance controller.

Control is passed to block 820 via interface 864. Block 820 compares the microprocessor's program address to the value stored in the start address pointer register 420. As discussed in the description to FIG. 9, a preferred mode of the present invention may determine the number of times the microprocessor executes a particular program address or range of program addresses. Block 820 compares the microprocessor's program address to the value stored in the start address pointer register 420. Control is then passed to block 822 via interface 870. Block 822 determines whether the interval timer 440 has overflowed. The function performed by block 822 (as well as block 830) may be performed in parallel with the other steps. If the interval timer has overflowed, control is passed to block 900 (see FIG. 11c). If the interval timer has not overflowed, control is passed to block 824 via interface 872. Block 824 determines whether the microprocessor's program address differs from the value contained in the start address pointer register 420 only in the bits masked by the value contained in the start address mask register 422. If there are addition differences besides those indicated by the data in start address mask register 422, control is passed to block 820 via interface 868. This loop is continued until either the interval counter 440 overflows or there is a satisfactory match between the microprocessor's program address and the value contained in start address pointer register 420. If a satisfactory match is obtained, control is passed to block 826 via interface 874. Block 826 sets the program match F/F 438 thus asserting interface 478. Interface 478 is coupled to the "10" input of condition selector MUX 428. The signal passes through condition selector MUX 428 and onto interface 500. At the next rising edge of UPDATE(8/32/128/512 USEC) 470, ANDGATE 436 passes the condition selector MUX signal onto interface 498. Interface 498 is coupled to event counter 582, thus enabling event counter 582 to count an event. Therefore, in this mode the exemplary embodiment counts the number of events that occur on UPDATE(8/32/128/512 USEC), but only when an event is present on the node selected by condition selector MUX 428. This mode is ideal for measuring the percentage of activity of the preselected node. That is, the system may divide the total number of pulses imposed on UPDATE(8/32/128/512 USEC) by the number of events that are counted. The result may be the percentage of activity for the preselected node. If the condition selector MUX 428 is set to select the output of the PROGRAM-MATCH F/F 438, the preferred mode of the present invention uses this mode of operation to calculate the percentage of activity.

Control is then passed to block 828 via interface 878. Block 828 compares the microprocessor's program address to the value stored in the end address pointer register 424. Control is then passed to block 830 via interface 882. Block 830 determines whether the interval counter 440 has overflowed. As stated above, block 830 may be executed in parallel with the other steps. If the interval counter 440 has overflowed, control is passed to block 900 (see FIG. 11c). If the interval counter 440 has not overflowed, control is passed to block 832 via interface 884. Block 832 determines whether the microprocessor's program address differs by the value contained in the end address pointer register 424 in only the bits indicated by the value contained in the end address mask register 426. If there are bits that do not match other than those indicated by the value contained in end address mask register 426, control is passed to block 828 via interface 880. This loop is continued until either the interval counter 440 overflows or the microprocessor's program address satisfactorily matches the value contained in the end address pointer register 424. Once there is a satisfactory match, control is passed to block 834 via interface 886. Block 834 clears the program match F/F 438 via interface 496.

When the microprocessor's program address matches the value contained in the start address pointer register 420 the program match F/F 438 will be set via interface 494. Thereafter, when the microprocessor's program address matches the value contained in the end address pointer register 424 the program match F/F 438 will be cleared via interface 496. Although this is the preferred embodiment for the present invention, it is not limited to this configuration.

In any event, the program match will be counted via event counter 582. Control is passed to block 900 via interface 888. Block 900 determines whether the interval counter 440 has overflowed. If it has not overflowed, control is passed to block 820 via interface 866. This loop is continued until the interval counter 440 overflows.

Once the interval counter 440 has overflowed, control is passed to block 902 via interface 926. Block 902 transfers the total accumulated number of events that are contained in the event counter 582 to the event holding register 442 via interface 522. Control is then passed to block 904 via interface 928. Block 904 sets the service request register 446 which in turn issues a service request via interface 520. In the preferred mode of the present invention, the service request is received by a maintenance controller. The service request communicates to the maintenance controller that the interval counter 440 has overflowed. Control is them passed to block 906 via interface 930.

Figure 11C:
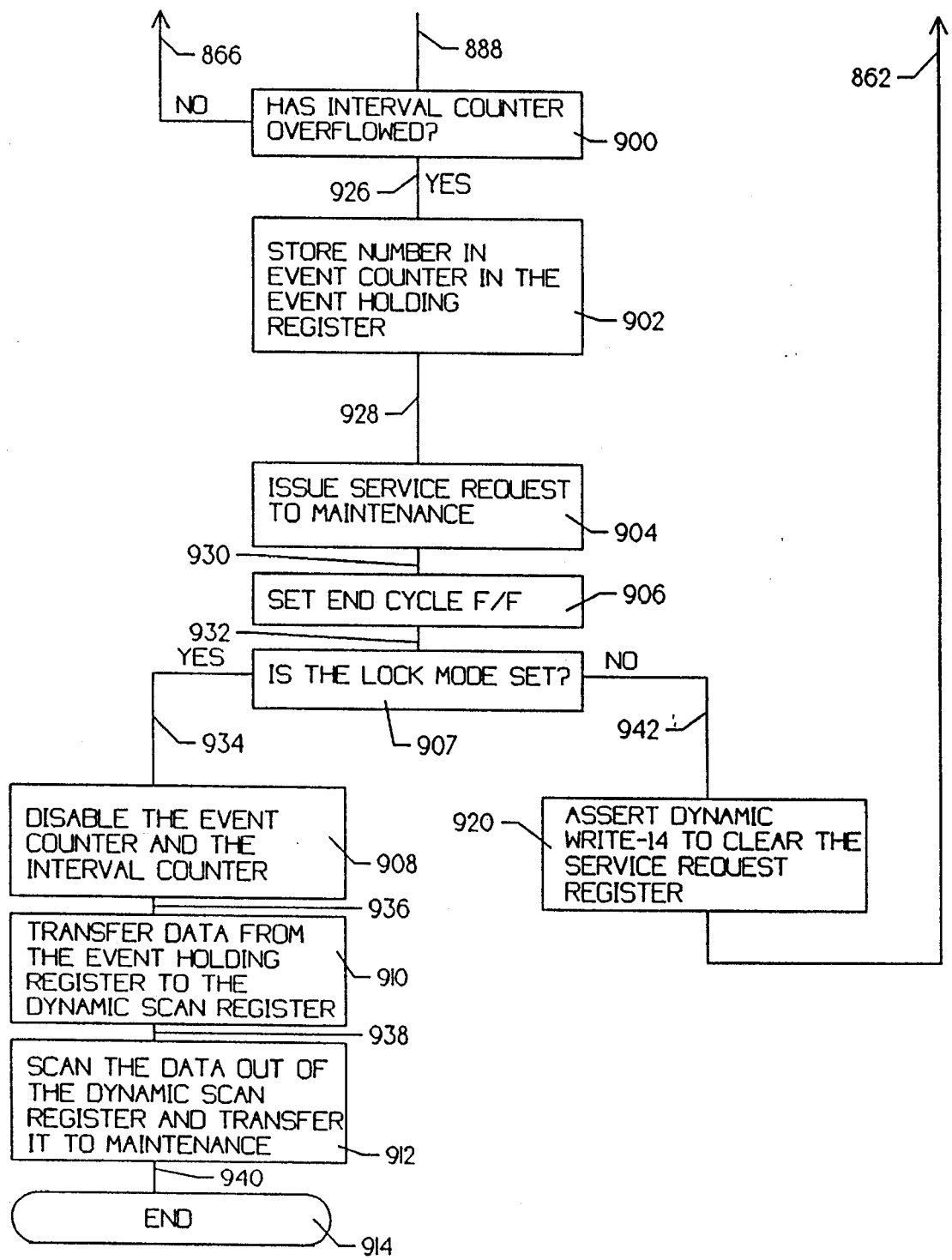
FIG. 11C is the third part of the detailed flow diagram shown in FIG. 11A and FIG. 11B.

Block 906 sets the cycle-end-F/F 448. Blocks 902, 904, and 906 may be executed in parallel rather than sequentially as indicated in FIG. 11C. Control is then passed to block 907 via interface 932. Block 907 determines whether the performance monitoring hardware is in a single sample mode or a continuous sample mode. In the preferred embodiment of the present invention, a lock signal 476 is asserted when the performance monitoring hardware is in the single sample mode.

If the performance monitoring hardware is in single sample mode, control is passed to block 908 via interface 934. Block 908 disables the event counter 582 and the interval counter 440. In the preferred mode of the present invention, this is accomplished by ANDGATE 450. As previously stated, block 906 asserts interface 512 when the interval counter 440 overflows. In addition, when in the single sample mode, lock 476 is asserted. In response to this combination, ANDGATE 450 asserts interface 502. The disable input of event counter 582 and the interval counter 440 are coupled to interface 502 thus disabling these components after interval counter 440 has overflowed. Control is then passed to block 910 via interface 936. Block 910 transfers data from the event holding register 442 to the dynamic scan register 444. Control is then passed to block 912 via interface 938. Block 912 scans the data out of the dynamic scan register 444 and transfers it to a maintenance controller. Blocks 908, 920 and 912 may be executed in parallel rather than sequentially. The algorithm is exited at end block 914.

Referring back to block 907, if the performance monitoring hardware is in the continuous sample mode, control is passed to block 920 via interface 942. Block 920 asserts dynamic-write-14 516 to clear the service request register 446. Control is then passed back to block 820 via interface 862. This loop is continued until the maintenance controller interrupts the performance monitor hardware.

Having thus described the preferred embodiments of the present invention, those of skill in the art will readily appreciate that yet other embodiments may be made and used within the scope of the claims hereto attached.

We claim:

1. An apparatus for monitoring the performance of a computer system, the computer system having a maintenance controller and further having a plurality of preselected nodes wherein the computer system provides a number of signal values, sequenced in time, on a selected set of the plurality of preselected nodes, comprising:
   a. a performance monitoring hardware element;
   b. permanent interfacing means coupled to said performance monitoring hardware element for permanently interfacing said performance monitoring hardware element to the selected set of preselected modes within the computer system;
   c. counting means coupled to said performance monitoring hardware element for determining an activity level by counting the number of times the computer system provides a predetermined sequence of signal values on the selected set of preselected nodes, over a predetermined period of time; and
   d. providing means coupled to said counting means for providing the activity level to the maintenance controller.

2. An apparatus according to claim 1 wherein there is a plurality of performance monitoring hardware elements and a plurality of corresponding counting means within the computer system wherein each of the plurality of monitoring hardware elements and the plurality of corresponding counting means are coupled to a different selected set of the plurality of preselected nodes.

3. An apparatus according to claim 1 wherein the selected set of preselected nodes includes a program address bus of a microprocessor element in the computer system.

4. An apparatus for monitoring the performance of a computer system, the computer system having a maintenance controller and further having a microprocessor element, the microprocessor element having a program address bus wherein the microprocessor provides a number of address values, sequenced in time, on the program address bus, comprising:
   a. a performance monitoring hardware element coupled to the program address hardware bus of the microprocessor element;
   b. determining means coupled to said performance monitoring hardware element for determining when a predetermined set of the number of address values matches a predetermined sequence of address values;
   c. counting means coupled to said determining means for determining an activity level by counting the number of times that said determining means determines a match over a predetermined period of time; and
   d. providing means coupled to said counting means for providing the activity level to the maintenance controller.

5. An apparatus for monitoring the performance of a computer system, the computer system having a maintenance controller and further having a microprocessor element, the microprocessor element having a program address, comprising:
   a. a performance monitoring hardware element coupled to the program address bus of the microprocessor element;
   b. first determining means coupled to said performance monitoring hardware element for determining when the program address of the microprocessor element matches a predetermined starting address;
   c. second determining means coupled to said performance monitoring hardware element for determining when the program address of the microprocessor element matches a predetermined ending address;
   d. counting means coupled to said first determining means and said second determining means for determining an activity level by counting the number of times said first determining means determines a match and subsequently said second determining means determines a match, over a predetermined period of time; and
   e. providing means coupled to said counting means for providing the activity level to the maintenance controller.

6. An apparatus for monitoring the performance of a computer system, the computer system having a maintenance controller and further having a microprocessor element wherein the microprocessor element has a preselected program address bus, comprising:
   a. a performance monitoring hardware element coupled to the preselected program address bus of the microprocessor element;
   b. a first comparator coupled to said performance monitoring hardware element for comparing the program address of the microprocessor element with a predetermined starting address;
   c. a second comparator coupled to said performance monitoring hardware element for comparing the program address of the microprocessor element with a predetermined second address;
   d. a counter coupled to said first comparator and further coupled to said second comparator for determining an activity level by counting the number of times said first comparator determines a match between the program address and the predetermined first address and subsequently said second comparator determines a match between the program address and the predetermined second address, in a predetermined period of time; and
   e. providing means coupled to said counter for providing the activity level to the maintenance controller.

7. An apparatus according to claim 6 further comprising:

e. a first masking circuit coupled to said first comparator for masking out a predetermined portion of the first comparator thus indicating a match for the predetermined portion of the first comparator; and f. a second masking circuit coupled to said second comparator for masking out a predetermined portion of the second comparator thus indicating a match for the predetermined portion of the second comparator.

8. An apparatus for monitoring the performance of a computer system, the computer system having a microprocessor element and the microprocessor element having a program address, comprising:

a. a start address pointer register;

b. a start address mask register;

c. an end address pointer register;

d. an end address mask register;

e. a first dynamic write port hardware bus coupled to said start address pointer register for loading said start address pointer register with a first initial value;

f. a second dynamic write port hardware bus coupled to said start address mask register for loading said start address mask register with a second initial value;

g. a third dynamic write port hardware but coupled to said end address pointer register for loading said end address pointer register with a third initial value;

h. a fourth dynamic write port hardware bus coupled to said end address mask register for loading said end address mask register with a fourth initial value;

i. a first bit comparator coupled to said start address pointer register and further coupled to the program address for performing a bit-by-bit comparison of the first initial value and the program address and for providing a first result;

j. a second bit comparator coupled to said first bit comparator and further coupled to said start address mask register for performing a bit-by-bit comparison of the second initial value and the result of the first bit comparator thereby masking out predetermined bits from the comparison and for providing a second result;

k. a third bit comparator coupled to said end address pointer register and further coupled to the program address for performing a bit-by-bit comparison of the third initial value and the program address and for providing a third result;

l. a fourth bit comparator coupled to said first bit comparator and further coupled to said end address mask register for performing a bit-by-bit comparison of the fourth initial value and the result of the third bit comparator thereby masking out predetermined bits from the comparison and for providing a fourth result;

m. a program match register coupled to said second bit comparator and said fourth bit comparator wherein said program match register is set by the result of said second bit comparator and is cleared by the result of said fourth bit comparator;

n. an event counter coupled to said program match register for counting the number of times said program match register is set;

o. an event holding register couple to said event counter for periodically storing the value contained in the event counter;

p. a mode port, the mode port being asserted into a first state when in a single sample mode and the mode port being asserted into a second state when in a continuous sample mode; and q. a interval counter coupled to said event counter and further coupled to said event holding register, the interval counter counting for a predetermined time period before enabling the event holding register to capture the value contained in the event counter, the interval counter also disabling the event counter and the interval counter when the mode port is asserted in said first state.

9. An apparatus for monitoring the performance of a computer system wherein the computer system has a maintenance controller and further has a plurality of preselected nodes wherein the operation of the computer system causes events to occur on said preselected nodes, comprising:

a. a plurality of test condition input ports, at least one of said plurality of test condition input ports being coupled to one of said plurality of preselected nodes in the computer system;

b. a condition selector multiplexer for selecting one of said plurality of test condition input ports;

c. an event counter coupled to said condition selector multiplexer for determining an activity level by counting the number of events that occur on said selected test condition input port;

d. an event holding register coupled to said event counter for periodically storing the activity level contained in the event counter;

e. a mode port, the mode port being asserted into a first state when in a single sample mode and the mode port being asserted into a second state when in a continuous sample mode;

f. an interval counter coupled to said event counter and further coupled to said event holding register, the interval counter counting for a predetermined time period before enabling the event holding register to capture the activity level contained in the event counter, the interval counter also disabling the event counter and the interval counter when the mode port is asserted in said first state; and e. transferring means coupled to the event holding register for transferring the activity level from the event holding register to the maintenance controller.

10. A method for monitoring the performance of a computer system with a performance monitoring hardware element having a test condition input port which is coupled to a preselected node within the computer system, the computer system having a program address, comprising:

a. initializing the performance monitoring hardware element with initial values;

b. starting an interval timer;

c. comparing the program address to a start address pointer;

d. masking out a predetermined portion of the program address from the comparison in step (c) thereby effectively providing a match between the predetermined portion of the program address and the start address pointer;

e. incrementing an event counter if steps (c)–(d) indicate a match;

f. comparing the program address to an end address pointer;

g. masking out a predetermined portion of the program address from the comparison in step (f) thereby effectively providing a match between the predetermined portion of the program address and the end address pointer;

h. determining if the interval timer has expired and if the interval timer has not expired, returning to step (c);

i. interrupting steps (c)–(h) if the interval timer expires and then proceeding with step (j); and j. processing the total number of events counted in step (e).

11. An apparatus for monitoring the performance of a computer system, the computer system having a maintenance controller and further having a plurality of preselected nodes wherein the computer system provides a number of signal values, sequenced in time, on a selected set of the plurality of preselected nodes, and wherein the computer system providing a sample period by asserting a sample period signal, comprising:

a. a performance monitoring hardware element;

b. permanent interfacing means coupled to said performance monitoring hardware element for permanently interfacing said performance monitoring hardware element to a selected one of the plurality of preselected nodes within the computer system;

c. counting means coupled to said performance monitoring hardware element for determining an activity level by counting the number of times the computer system provides a predetermined sequence of signal values on the selected set of preselected nodes during the sample period; and d. providing means coupled to said counting means for providing the activity level to the maintenance controller.

12. An apparatus for monitoring the performance of a computer system, the computer system having a program address, comprising:

a. a performance monitoring means coupled to the computer system, said performance monitoring means having a test condition input port which is coupled to a preselected node within the computer system;

b. initializing means for initializing said performance monitoring means with initial values;

c. providing means coupled to said performance monitoring means for providing a predetermined sample period via a sample pulse;

d. first comparing means coupled to said performance monitoring means for comparing the program address to a start address pointer;

e. first masking means for masking out a predetermined portion of the program address from the first comparing means thereby effectively providing a match between the predetermined portion of the program address and the start address pointer;

f. incrementing means for incrementing an event counter if the first comparing means indicates a match;

g. second comparing means for comparing the program address to an end address pointer;

h. second masking means for masking out a predetermined portion of the program address from the comparing means thereby effectively providing a match between the predetermined portion of the program address and the end address pointer;

i. determining means for determining if the sample period has expired; and j. processing means for processing the total number of events counted after the predetermined sample period expires.

13. An apparatus for monitoring the performance of a computer system, the computer system having a maintenance controller and further having a plurality of preselected nodes wherein the computer system provides a number of signal values, sequenced in time, on a selected set of the plurality of preselected nodes, and wherein the computer system providing a sample period by asserting a sample period signal, comprising:

a. a performance monitoring hardware element;

b. permanent interfacing means coupled to said performance monitoring hardware element for permanently interfacing said performance monitoring hardware element to the selected set of preselected nodes within the computer system;

c. counting means coupled to said performance monitoring hardware element for determining an activity level by counting the number of times the computer system provides a predetermined sequence of signal values on the selected set of preselected nodes, during the sample period; and d. providing means coupled to said counting means for providing the activity level to the maintenance controller.

14. An apparatus according to claim 13 wherein the performance monitoring hardware element is coupled to a plurality of preselected nodes within the computer system.

15. An apparatus according to claim 14 wherein the performance monitoring hardware element is coupled to a program address bus of a microprocessor element in the computer system.

16. An apparatus for monitoring the performance of a computer system, the computer system having a maintenance controller and further having a microprocessor element wherein the microprocessor element has a program address bus, the microprocessor providing a number of address values sequenced in time, on the program address bus, and the microprocessor providing a sample period by asserting a sample period signal, comprising:

a. a performance monitoring hardware element coupled to the program address hardware bus of the microprocessor element;

b. first determining means coupled to said performance monitoring hardware element for determining when a first predetermined set of the number of address values matches a first predetermined sequence of address values;

c. first counting means coupled to said first determining means for determining a first activity level by counting the number of times that said first determining means determines a match during the sample period;

d. second determining means coupled to said performance monitoring hardware element for determining when a second predetermined set of the number of address values matches a second predetermined sequence of address values;

e. second counting means coupled to said second determining means for determining a second activity level by counting the number of times that said second determining means determines a match during the sample period;

f. first providing means coupled to said first counting means for providing the first activity level to the maintenance controller; and g. second providing means coupled to said second counting means for providing the second activity level to the maintenance controller.

17. An apparatus for monitoring the performance of a computer system, the computer system having a maintenance controller and further having a microprocessor element wherein the microprocessor element has a preselected program address bus, comprising:

a. a performance monitoring hardware element coupled to the preselected program address bus of the microprocessor element;

b. first determining means coupled to said performance monitoring hardware element for determining when the program address of the microprocessor element matches a predetermined starting address;

c. second determining means coupled to said performance monitoring hardware element for determining when the program address of the microprocessor element matches a predetermined ending address;

d. counting means coupled to said first determining and further to said second determining means for determining an activity level by counting the number of times said first determining means determines a match and subsequently said second determining means determines a match, during the sample period; and e. providing means coupled to said counting means for providing the activity level to the maintenance controller.

18. An apparatus for monitoring the performance of a computer system, the computer system having a maintenance controller and further having a microprocessor element wherein the microprocessor element has a preselected program address bus, comprising:

a. a performance monitoring hardware element coupled to the preselected program address hardware bus of the microprocessor element;

b. a comparator coupled to said performance monitoring hardware element for comparing the program address of the microprocessor element with a predetermined address;

c. a counter coupled to said comparator for determining an activity level by counting the number of times that said comparator determines a match between the program address and the predetermined address when an event is present during a sample pulse period;

d. a masking circuit coupled to said comparator for masking out a predetermined portion of the comparator thus indicating a match for the predetermined portion; and e. providing means coupled to said counter for providing the activity level to the maintenance controller.

19. An apparatus for monitoring the performance of a computer system, the computer system having a maintenance controller and further having a microprocessor element wherein the microprocessor element has a preselected program address bus, the microprocessor providing a sample period by asserting a sample period signal, comprising:

a. a performance monitoring hardware element coupled to the preselected program address bus of the microprocessor element;

b. a first comparator coupled to said performance monitoring hardware element for comparing the program address of the microprocessor element with a predetermined starting address;

c. a second comparator coupled to said performance monitoring hardware element for comparing the program address of the microprocessor element with a predetermined second address;

d. a counter coupled to said first comparator and further coupled to said second comparator for determining an activity level by counting the number of times said first comparator determines a match between the program address and the predetermined first address and subsequently said second comparator determines a match between the program address and the predetermined second address, during the sample period; and e. providing means coupled to said counter for providing the activity level to the maintenance controller.

20. An apparatus according to claim 4 wherein said predetermined address sequence is a predetermined address range.

21. A method for monitoring the performance of a computer system with a performance monitoring hardware element having a test condition input port which is coupled to a preselected node within the computer system, the computer system having a program address, comprising:

a. initializing the performance monitoring hardware element with initial values;

b. starting an interval timer;

c. comparing the program address to a start address pointer;

d. incrementing an event counter if steps (c) indicate a match;

e. returning to step (c) if step (c) does not indicate a match;

f. comparing the program address to an end address pointer;

g. returning to step (f) if step (f) does not indicate a match;

h. returning to step (c) of step (f) does indicate a match;

i. interrupting steps (c)–(h) if the interval timer expires and then proceeding with step (j); and j. processing the total number of events counted in step (d).

22. An apparatus for monitoring the performance of a computer system, the computer system providing a number of time sequenced program addresses, comprising:

a. a performance monitoring means coupled to the computer system, said performance monitoring means having a test condition input port which is coupled to a preselected node within the computer system;

b. initializing means for initializing said performance monitoring means with initial values;

c. providing means coupled to said performance monitoring means for providing a predetermined sample period via a sample pulse;

d. first comparing means coupled to said performance monitoring means for comparing the number of time sequenced program addresses to a start address pointer;

e. incrementing means for incrementing an event counter if the first comparing means indicates a match between one of said time sequenced program addresses and said start address pointer, said incrementing means becoming disabled after incrementing the event counter;

f. second comparing means for comparing the number of time sequenced program addresses to an end address pointer, said second comparing means enabling said incrementing means if said second comparing means determines that one of the number of time sequenced program addresses matches said end address pointer;

g. determining means for determining if the sample period has expired; and h. processing means for processing the total number of events counted during the predetermined sample period.

\* \* \* \* \*

UNITED STATES PATENT AND TRADEMARK OFFICE
CERTIFICATE OF CORRECTION

PATENT NO. : 5,581,482

DATED : December 3, 1996

INVENTOR(S) : Wiedenman et al.

It is certified that error appears in the above-identified patent and that said Letters Patent is hereby corrected as shown below:

Column 21, line 25, delete "but", and insert in its place --bus--.

Signed and Sealed this

Eighteenth Day of February, 1997

Attest:

BRUCE LEHMAN

Attesting Officer

Commissioner of Patents and Trademarks